(12) United States Patent
Thubert et al.

(10) Patent No.: US 11,659,436 B2
(45) Date of Patent: *May 23, 2023

(54) SCALABLE REACHABILITY FOR MOVABLE DESTINATIONS ATTACHED TO A LEAF-SPINE SWITCHING ARCHITECTURE

(71) Applicant: Cisco Technology, Inc., San Jose, CA (US)

(72) Inventors: Pascal Thubert, Roquefort les Pins (FR); Patrick Wetterwald, Mouans Sartoux (FR); Eric Michel Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/347,640

(22) Filed: Jun. 15, 2021

(65) Prior Publication Data
US 2021/0306908 A1 Sep. 30, 2021

Related U.S. Application Data

(63) Continuation of application No. 16/372,744, filed on Apr. 2, 2019, now Pat. No. 11,089,507.

(51) Int. Cl.
*H04L 12/721* (2013.01)
*H04W 28/02* (2009.01)
*H04L 49/50* (2022.01)

(52) U.S. Cl.
CPC ......... *H04W 28/0289* (2013.01); *H04L 49/50* (2013.01)

(58) Field of Classification Search
CPC .......................... H04L 49/50; H04W 28/0289
See application file for complete search history.

(56) References Cited

U.S. PATENT DOCUMENTS 7,411,967 B2 8/2008 Thubert et al.
7,428,221 B2 9/2008 Thubert et al.
(Continued)

OTHER PUBLICATIONS

Filyurin, Ed., "RIFT—Motivation, Additional Requirements and Use Cases in User Access Networks", [online], RIFT Working Group, Internet-Draft, Jun. 13, 2018, [retrieved on Oct. 16, 2018]. Retrieved from the Internet: URL: <https://tools.ietf.org/pdf/draft-filyurin-rift-access-networks-00.pdf>, pp. 1-16.

(Continued)

*Primary Examiner* — Phuc H Tran
(74) *Attorney, Agent, or Firm* — Behmke Innovation Group LLC; James M. Behmke; Jonathon P. Western

(57) ABSTRACT

In one embodiment, a method comprises: determining, by a network switching device, whether the network switching device is configured as one of multiple leaf network switching devices, one of multiple Top-of-Fabric (ToF) switching devices, or one of multiple intermediate switching devices in a switched data network having a leaf-spine switching architecture; if configured as a leaf switching device, limiting flooding of an advertisement only to a subset of the intermediate switching devices in response to detecting a mobile destination is reachable; if configured as an intermediate switching device, flooding the advertisement, received from any one of the leaf network switching devices, to connected ToF switching devices without installing any routing information specified within the advertisement; if configured as a ToF switching device, installing from the flooded advertisement the routing information and tunneling a data packet, destined for the mobile destination, to the leaf switching device having transmitted the advertisement.

20 Claims, 16 Drawing Sheets

(56) References Cited

U.S. PATENT DOCUMENTS

| | | | |
|---|---|---|---|
| 7,443,880 | B2 | 10/2008 | Wetterwald et al. |
| 7,567,577 | B2 | 7/2009 | Thubert et al. |
| 7,639,686 | B2 | 12/2009 | Wetterwald et al. |
| 8,059,620 | B2 | 11/2011 | Moon |
| 8,892,708 | B2 | 11/2014 | Merrill et al. |
| 9,088,502 | B2 | 7/2015 | Thubert et al. |
| 9,116,736 | B2 | 8/2015 | Shamsee et al. |
| 9,210,071 | B2 | 12/2015 | Allan et al. |
| 9,473,570 | B2 | 10/2016 | Bhanujan et al. |
| 9,729,406 | B2 | 8/2017 | Jeuk et al. |
| 10,033,766 | B2 | 7/2018 | Gupta et al. |
| 10,057,109 | B2 | 8/2018 | Shatzkamer et al. |
| 10,080,224 | B2 | 9/2018 | Thubert et al. |
| 10,116,467 | B2 | 10/2018 | Brissette et al. |
| 10,447,601 | B2 | 10/2019 | Fedyk |
| 2015/0200872 | A1 | 7/2015 | Huang et al. |
| 2018/0183706 | A1 | 6/2018 | Przygienda et al. |
| 2018/0278578 | A1 | 9/2018 | Johnsen et al. |
| 2018/0367594 | A1 | 12/2018 | Levy-Abegnoli et al. |
| 2020/0099659 | A1 | 3/2020 | Cometto et al. |
| 2020/0322838 | A1* | 10/2020 | Thubert .......... H04L 49/50 |
| 2021/0306908 | A1* | 9/2021 | Thubert .......... H04L 49/50 |

OTHER PUBLICATIONS

Przygienda, Ed., et al., "RIFT: Routing in Fat Trees", [online], RIFT Working Group, Internet-Draft, Jun. 21, 2018, [retrieved on Oct. 16, 2018]. Retrieved from the Internet: URL: <https://tools.ietf.org/pdf/draft-ietf-rift-rift-02.pdf>, pp. 1-88.

Zheng et al., "RIFT YANG Model", [online] RIFT Working Group, Internet-Draft, Sep. 20, 2018, [retrieved on Oct. 1, 2018]. Retrieved from the Internet: URL: <https://tools.ietf.org/pdf/draft-zhang-rift-yang-01.pdf>, pp. 1-23.

Zhang et al., "Supporting BIER with RIFT", [online] BIER, Internet-Draft, Mar. 5, 2018, [retrieved on Oct. 16, 2018]. Retrieved from the Internet: URL: <https://tools.ietf.org/pdf/draft-zzhang-bier-rift-00.pdf>, pp. 1-7.

Manjunath et al., "An Efficient Routing Scheme for Wireless Sensor Networks", [online] International Journal of Computer Science and Information Technologies, vol. 1 (4), [retrieved on Nov. 16, 2018]. Retrieved from the Internet: URL: <http://ijcsit.com/docs/Volume%202/vol2issue4/ijcsit2011020487.pdf>, pp. 1798-1801.

Zahid, "Network Optimization for High Performance Cloud Computing", [online], Aug. 2017, [retrieved on Nov. 16, 2018]. Retrieved from the Internet: URL: <https://www.google.com/url?sa=t&rct=j&q=&esrc=s&source=web&cd=3&ved=2ahUKEwjZkoXdrNbeAhVJcCsKHcPEBycQFjACegQIBRAC&url=https%3A%2F%2Fwww.simula.no%2Ffile%2Fphd-feroz-zahid-2017pdf%2Fdownload&usg=AOvVaw0iQ8L0mBF88pagesRdqCcB6qNxuV->, 88 pages.

Perkins, Ed., et al., "Mobility Support in IPv6", [online], Internet Engineering Task Force (IETF), Request for Comments: 6275, Jul. 2011, [retrieved on Mar. 14, 2019]. Retrieved from the Internet: URL: <https://tools.ietf.org/pdf/rfc6275.pdf>, pp. 1-169.

Tantsura et al., "Routing in Fat Trees (RIFT)", [online], [retrieved on Oct. 16, 2018]. Retrieved from the Internet: URL: <https://datatracker.ietf.org/wg/rift/about/>, pp. 1-3.

Przygienda, "RIFT De'Mystified (a bit) ;-), Major RIFT Flows/Procedures on a mini-Fabric & Partial Update RIFT-01 Draft (without Mobility)", [online], May 2018, [retrieved on Oct. 16, 2018]. Retrieved from the Internet: URL: <https://datatracker.ietf.org/meeting/interim-2018-rift-01/materials/slides-interim-2018-rift-01-sessa-rift-protocol.pdf>, pp. 1-24.

Thubert et al., "Registration Extensions for 6LoWPAN Neighbor Discovery", [online], Jun. 19, 2018, [retrieved on Apr. 1, 2019]. Retrieved from the Internet: URL: <https://tools.ietf.org/pdf/draft-ietf-6lo-rfc6775-update-21.pdf>, pp. 1-45.

Thubert et al., U.S. Appl. No. 16/360,101, filed Mar. 21, 2019.

Wetterwald et al., U.S. Appl. No. 16/274,567, filed Feb. 13, 2019.

* cited by examiner

SCALABLE REACHABILITY FOR MOVABLE DESTINATIONS ATTACHED TO A LEAF-SPINE SWITCHING ARCHITECTURE

This application is a continuation of application Ser. No. 16/372,744, filed Apr. 2, 2019.

TECHNICAL FIELD

The present disclosure generally relates to scalable reachability for movable destinations attached to a leaf-spine switching architecture.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) RIFT ("Routing in Fat Trees") Working Group is investigating a new routing protocol for a data center network architecture that utilizes a leaf-spine switching architecture (e.g., a "Fat Tree") comprising a top spine level comprising a large number (e.g., one hundred or more) of "highly-connected" switching devices, and additional layers of switching devices "south" of the top spine level, including a "bottom" layer of leaf switching devices. Reachability advertisement messages from the leaf switching devices are flooded "northwards" toward the top spine level; reachability advertisement messages from the top spine level, however, are limited to one-hop advertisements "southwards".

A problem arises, however, where the unrestricted northward flooding of reachability advertisement messages in the highly-connected leaf-spine switching architecture limits the scalability of updating reachability information for movable destinations. In particular, if a destination attached to a first leaf switching device moves to a second leaf switching device, the old routes associated with reaching the destination via the first leaf switching device must be invalidated and removed throughout the leaf-spine switching architecture, and new routes for reaching the destination via the second leaf switching device must be installed quickly to minimize packet loss after the movement; hence, unrestricted northward flooding of updated reachability advertisement messages can cause unnecessary processing burdens on the switching devices.

The problems associated with limited scalability in the leaf-spine switching architecture are particularly noticeable where numerous movable destinations are deployed as mobile virtualized agents that move every few milliseconds between host network devices attached to different leaf switching devices in different respective locations of the leaf-spine switching architecture. Flooding of advertisement messages throughout all the switching devices of the switched data network every few milliseconds can quickly overwhelm the switched data network with excessive advertisement messages that can cause congestion in the switched data network; hence, the switching devices in the leaf-spine switching architecture would most likely be unable to update their routing tables in response to each of the flooded advertisement messages every few milliseconds.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
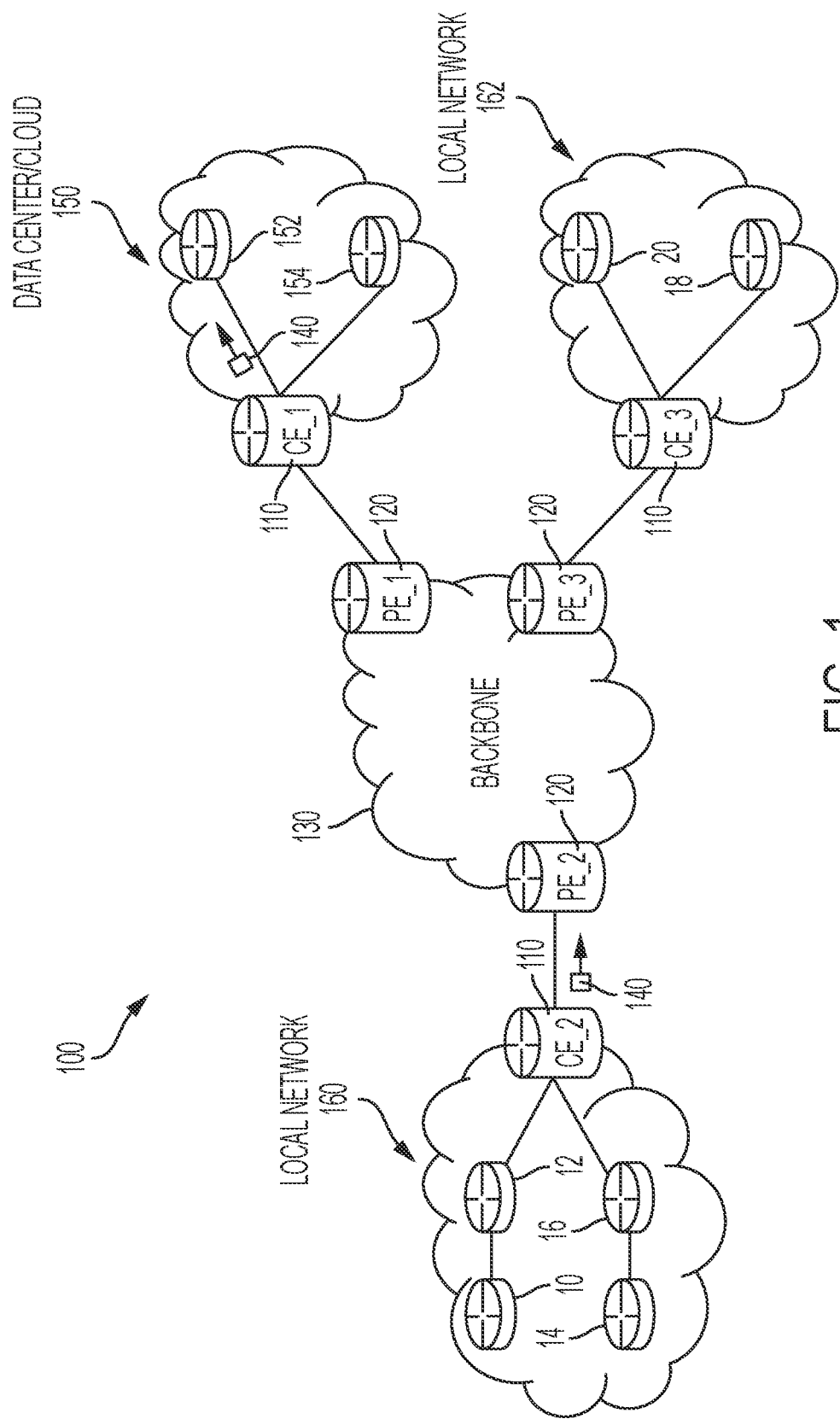
FIG. 1 illustrates an example communication network comprising a switched data network comprising network switching devices for tunneling a data packet to a mobile destination.

In one embodiment, a method comprises determining, by a network switching device, whether the network switching device is configured as one of multiple leaf network switching devices, one of multiple Top-of-Fabric (ToF) switching devices, or one of multiple intermediate switching devices in a switched data network having a leaf-spine switching architecture; if configured as the one leaf switching device, the network switching device limiting flooding of an advertisement only to a subset of the intermediate switching devices in response to detecting a mobile destination is reachable; if configured as the one intermediate switching device, the network switching device flooding the advertisement, received from any one of the leaf network switching devices, to connected ToF switching devices without installing any routing information specified within the advertisement; if configured as the one ToF switching device, installing from the flooded advertisement the routing information and tunneling a data packet, destined for the mobile destination, as a tunneled data packet to the one leaf switching device having transmitted the advertisement.

In another embodiment, an apparatus is implemented as a physical machine. The apparatus comprises non-transitory machine readable media configured for storing executable machine readable code, a device interface circuit configured for communications in a switched data network, and a processor circuit. The processor circuit is configured for executing the machine readable code, and when executing the machine readable code operable for: determining whether is configured as one of multiple leaf network switching devices, one of multiple Top-of-Fabric (ToF) switching devices, or one of multiple intermediate switching devices in a switched data network having a leaf-spine switching architecture, if configured as the one leaf switching device, the processor circuit is configured for limiting flooding of an advertisement only to a subset of the intermediate switching devices in response to detecting a mobile destination is reachable. If configured as the one intermediate switching device, the device interface circuit is configured for flooding the advertisement, received from any one of the leaf network switching devices, to connected ToF switching devices without installing any routing information specified within the advertisement. If configured as the one ToF switching device, the processor circuit is configured for installing from the flooded advertisement the routing information and tunneling a data packet, destined for the mobile destination, as a tunneled data packet to the one leaf switching device having transmitted the advertisement.

In another embodiment, one or more non-transitory tangible media encoded with logic for execution by a machine and when executed by the machine operable for: determining, by the machine implemented as a network switching device, whether the network switching device is configured as one of multiple leaf network switching devices, one of multiple Top-of-Fabric (ToF) switching devices, or one of multiple intermediate switching devices in a switched data network having a leaf-spine switching architecture; if configured as the one leaf switching device, the network switching device limiting flooding of an advertisement only to a subset of the intermediate switching devices in response to detecting a mobile destination is reachable; if configured as the one intermediate switching device, the network switching device flooding the advertisement, received from any one of the leaf network switching devices, to connected ToF switching devices without installing any routing information specified within the advertisement; if configured as the one ToF switching device, installing from the flooded advertisement the routing information and tunneling a data packet, destined for the mobile destination, as a tunneled data packet to the one leaf switching device having transmitted the advertisement.

DETAILED DESCRIPTION

Particular embodiments provide scalable reachability for one or more movable destinations that are attached to a highly-connected leaf-spine switching architecture (e.g., a "Fat Tree" architecture). The scalable reachability includes reachability for one or more movable destinations implemented as a mobile virtualized agent executed in an attached host device and that can reside in the attached host device for only a temporary interval (on the order of milliseconds) before moving to a second host device elsewhere in the leaf-spine switching architecture.

As described in further detailed below, the highly-connected leaf-spine switching architecture can be used in a data center executing software defined networking (SDN): the leaf-spine switching architecture can include a "Top of Fabric" (ToF) spine layer comprising ToF switching devices, a second layer of intermediate switching devices coupled to the ToF layer, and a leaf layer of leaf network switching devices coupled to the second layer and providing connectivity for attached host network devices. The leaf-spine switching architecture optimizes connectivity between the host network devices executing virtualized services, however, unrestricted northward flooding of an advertisement message (e.g., according to RIFT) limits the scalability of updating reachability information for movable destinations such as mobile virtualized agents that move between attached host network devices in different locations of the leaf-spine switching architecture.

According to example embodiments, a northbound advertisement message (advertising reachability to an attached mobile destination) can be output by a leaf network device based on limiting flooding of the advertisement only to a subset of connected intermediate switching devices (as opposed to unrestricted flooding of the advertisement to all intermediate switching devices). Each intermediate switching device receiving the northbound advertisement can flood the advertisement message to the connected ToF switching devices, without installing any routing information specified in the advertisement: in other words, the device interface circuit of the intermediate switching device only executes link-layer flooding of the advertisement message to the connected ToF switching devices (e.g., in response to a mobile flag detected in the advertisement message), without executing any network-layer processing of the advertisement message; hence, the device interface circuit of the intermediate switching device can ensure no network-layer processing is performed for any routing information in the advertisement message, in order to minimize use of resources in the intermediate switching device.

Each ToF switching device receiving the advertisement can install the routing information for reaching the mobile destination via the advertising leaf switching device. Hence, the ToF switching device can tunnel a data packet, destined for the mobile destination, as a tunneled data packet to the one leaf switching device having transmitted the advertisement. Any intermediate switching device receiving the southbound tunneled data packet can forward the tunneled data packet to the one leaf switching device based on prior routing information obtained by the intermediate switching device for reaching the one leaf switching device.

Hence, the particular embodiments enable scalable reachability to mobile destinations based on limiting flooding between the leaf layer and intermediate layer of the leaf-spine switching architecture to minimize congestion, avoiding network-layer processing of advertisement messages at the intermediate layer, and tunneling of data packets at the ToF layer, enabling the intermediate layers to rely on existing routing information for reaching leaf switching devices for forwarding of the tunneled data packets.

A description will first be provided of the leaf-spine switching architecture, followed by a description of the scalable reachability for the movable destinations attached to the leaf-spine switching architecture.

SDN Background

Software defined networking (SDN) represents an evolution of computer networks away from a decentralized architecture to one of centralized, software-based control. More specifically, in traditional computer networks, the control plane (e.g., selection of the routing path) and the data plane (e.g., forwarding packets along the selected path) are intertwined, with control plane decisions being made in a decentralized manner via signaling between the networking devices. In contrast, control plane decisions in an SDN-based network architecture are made by a centralized controller and pushed to the networking devices, as needed.

While applicable to any number of different types of network deployments, SDN is particularly of relevance to cloud service provider networks relying on data center network architectures for dynamic virtualization of services. Indeed, in a traditional client-server architecture, the network need only support traffic between the client and the server. However, with cloud computing, each transaction with a client may result in a large amount of "east-west"

traffic between nodes in the cloud provided by a data center (e.g., to perform a query or computation in parallel, etc.), as well as the traditional "north-south" traffic between the cloud and the client. In addition, the very nature of cloud computing environments allows for the rapid scaling of resources with demand, such as by instantiating new nodes up or down. In such situations, centralized control over the control plane results in better network performance over that of decentralized control.

FIG. 1 illustrates an example computer network 100 comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the a network backbone implemented using, for example, the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

Site Type B: a site connected to the network using two MPLS VPN links (e.g., from different service providers), with potentially a backup link (e.g., a 3G/4G/LTE connection). A site of type B may itself be of different types:

Site Type B1: a site connected to the network using two MPLS VPN links (e.g., from different service providers), with potentially a backup link (e.g., a 3G/4G/LTE connection).

Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

Site Type B3: a site connected to the public Internet using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

The network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc. The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

IoT devices can be extended to mobile "virtualized sensors" implemented as executable code hosted on (i.e., executed by) a physical host machine in the network: as described below, a host network device can execute a virtualized agent that operates as a "sensor" that can collect "sensor data" associated with the host network device on a per-executable resource basis (e.g., CPU utilization, memory utilization, network utilization, execution thread identification) to monitor the "footprint" of the corresponding executable resource, or device basis (device temperature, hardware status metrics, etc.).

The virtualized agent can be implemented as a "walker" (i.e., mobile) virtualized agent based on a management server (e.g., in the data center 150) initially allocating to the walker agent an Internet Protocol (IP) address, and assigning to the walker virtualized agent a list of IP addresses of host servers to execute the walker virtualized agent. Each host network device can include an executable daemon that can respond to an instruction for executing the walker virtualized agent; hence, in response to a host network device receiving instructions for executing the walker virtualized agent (comprising the list of IP addresses of host servers and the allocated IP address), the host network device during execution of the walker virtualized agent can cause the walker virtualized agent to monitor and collect localized "sensor" data, report the collected sensor data to a prescribed destination (e.g., the management server), and send an instruction to the next host network device on the list of IP addresses of host servers. Hence, the walker virtualized agent (i.e., mobile virtualized agent) can "move" to a sequence of host network devices in the network. Additional details of the walker agent can be found in U.S. Pub. No. 2018/0367594.

As described in further detail below, the example embodiments provide scalable reachability to the mobile virtualized agents as they "move" to different host network devices connected to a leaf-spine switching architecture.

Figure 2:
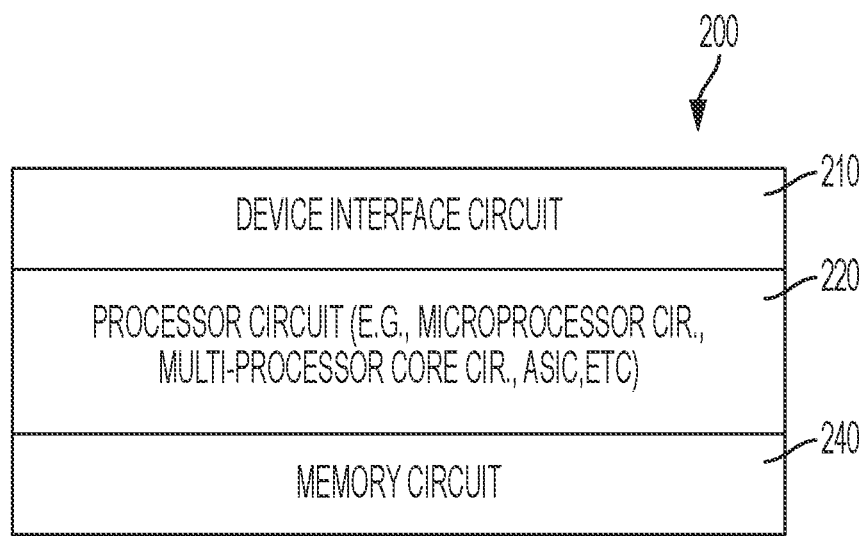
FIG. 2 illustrates an example implementation of any of the network devices of FIG. 1, according to an example embodiment.

FIG. 2 is a diagram illustrating an apparatus 200 that can be used to implement any of the devices described in any of the Figures shown herein and described below, according to an example embodiment. The apparatus 200 is a physical machine (i.e., a hardware device) configured for implementing network communications with other physical machines. The term "configured for" or "configured to" as used herein with respect to a specified operation refers to a device and/or machine that is physically constructed and arranged to perform the specified operation.

Each apparatus 200 (e.g. any one of the virtualization host devices 84, network switching device 118, 170, 170', and/or 180 described below) can include a device interface circuit 210, a processor circuit 220, and a memory circuit 240. The device interface circuit 210 can include one or more distinct physical layer transceivers for communication with any one of the other devices 200; the device interface circuit 210 also can include an IEEE based Ethernet transceiver for communications with any other devices via any type of data link (e.g., a wired or wireless link, an optical link, etc.). The processor circuit 220 can be configured for executing any of the operations described herein, and the memory circuit 240 can be configured for storing any data or data packets as described herein.

Any of the disclosed circuits of the devices 200 (including the device interface circuit 210, the processor circuit 220, the memory circuit 240, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 240) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 240 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 240 can be implemented dynamically by the processor circuit 220, for example based on memory address assignment and partitioning executed by the processor circuit 220.

As noted above, software defined networking (SDN) represents an evolution of computer networks that centralizes control plane decisions with a supervisory device. For example, in Application Centric Infrastructure (ACI), an SDN-based architecture from Cisco Systems, Inc., control plane decisions may be made by a centralized APIC. However, even with centralized control, there still exists the potential for seasonal congestion to occur on certain links in the network fabric.

In general, an SDN-based network fabric may utilize a leaf-spine architecture, such as CLOS and Fat-Tree architectures. This is particularly true in the case of data center and cloud networks that are poised to deliver the majority of computation and storage services in the future. In a Fat-Tree, nodes are organized in a tree structure with branches becoming 'fatter' towards the top of the hierarchy. In the context of computer networks, this increasing 'fatness' typically corresponds to increasing bandwidth towards the top of the hierarchy. CLOS networks typically involve multiple stages (e.g., an ingress stage, a middle stage, and an egress stage), with 'crossbar' switches at different stages that are interwoven such that multiple paths are available for switching, so that one traffic flow does not block another.

An SDN fabric that implements a leaf-spine switching architecture may operate by emulating a very large switch by interleaving many smaller switches, resulting in much lower cost and higher scalability. The benefits of such designs include, but are not limited to, the availability of an equal cost multi-path (ECMP) based switching fabric, a simplified network, and fully utilized link bandwidth on each network node. It also allows the networks to scale and grow incrementally, on demand. Cisco's next generation SDN based data center network fabric architecture, ACI, is also based on CLOS design principles.

Figure 3A:
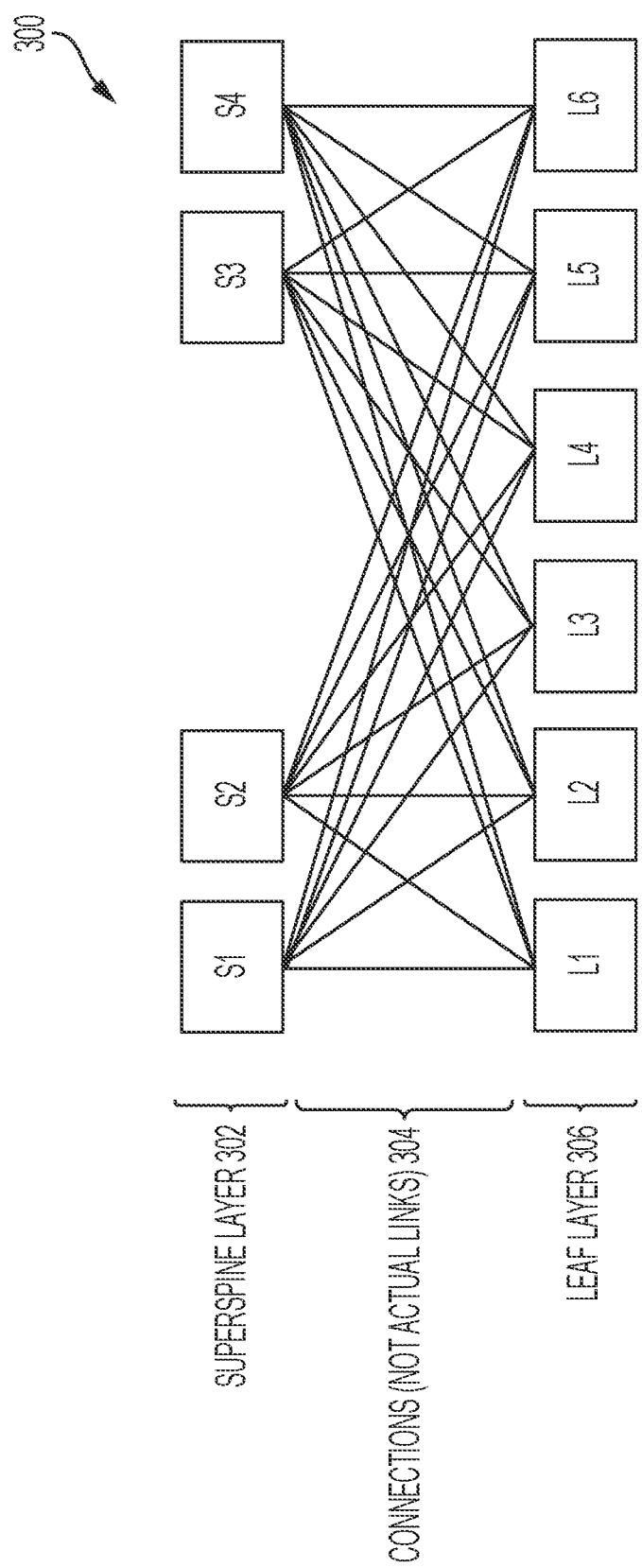
FIGS. 3A-3E illustrate example implementations of one of the data centers or data networks of FIG. 1 comprising a switched data network having a leaf-spine switching architecture, according to an example embodiment.

FIG. 3A illustrates a simplified example of an SDN fabric 300 that uses a leaf-spine architecture. As shown, the network switches S1-S4 and L1-L6 may be organized according to CLOS design principles. In particular, superspine switches S1-S4 may form a superspine switching layer 302, also referred to herein as a Top of Fabric (ToF) layer, such as in RIFT. At the south of end of the switching fabric 300 is a leaf layer 306 that comprises leaf switches L1-L6 and provide connectivity to the various clients of fabric 300, such as endpoints or virtual machines (VMs), and implement Layer 2 bridging and Layer 3 routing functions. Likewise, S1-S4 in superspine layer 302 may be fully meshed with L1-L6 in leaf layer 306 via connections 304 (as described below, the connections need not be physical data links). During operation, S1-S4 may provide redundant paths and connectivity from a previous lower-level stage switch in the network fabric.

Figure 3B:
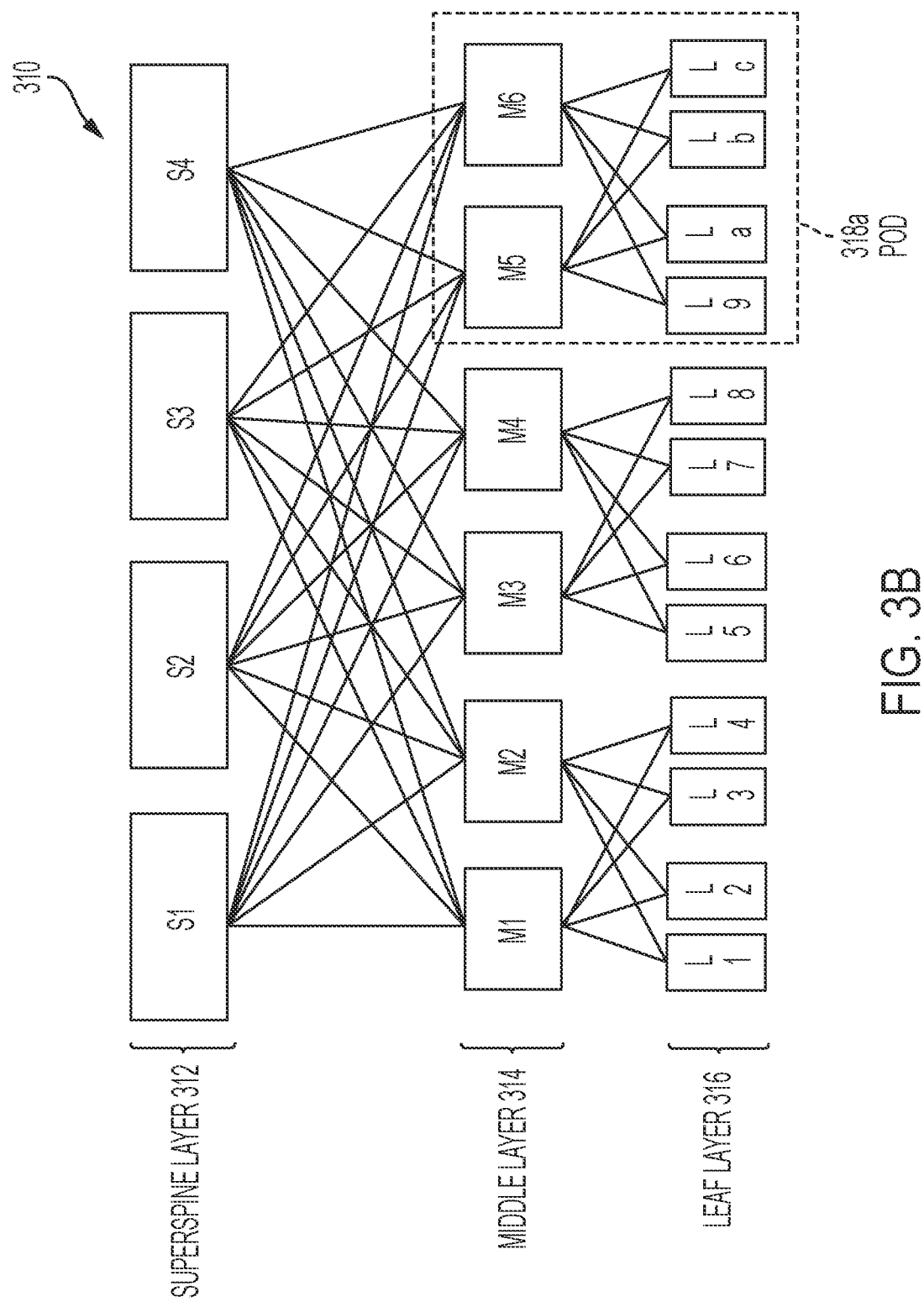

FIG. 3B illustrates another example SDN fabric 310 that uses a CLOS-based approach. The leaf-spine switching architecture 310 comprises at the top of the hierarchy ToF switches S1-S4 that form a ToF superspine layer 312 that are directly connected via link layer connections to a middle layer 314 comprising Top-of-Pod (ToP) switches M1-M6. The ToP switches M1-M6 are directly connected via link layer connections to a leaf layer 316 comprising leaf switches L1-Lc. The overall function of fabric 310 may be similar to that of fabric 300 in FIG. 3A, with the addition of middle layer 314 that can perform, for example, aggregation functions. Leaf switches and their associated connected intermediate switches in middle layer 314 may also form pods, such as pod 318a shown.

A large, virtualized data center fabric can comprise approximately 500-1000 leaf switches and as many as approximately 8-16 spine switches servicing many of its tenant's virtual networks on the shared, physical network infrastructure. Each leaf switch, in turn, may be connected to between 32-98 physical hypervisor servers, with each server hosting approximately 20 virtual servers/endpoints that estimate to between 1000-2000 endpoints connected per leaf switch. In such a shared network deployment, network access security becomes an important factor for consideration.

More specifically, in virtualized data center deployments, like ACI, the movement of endpoints from one leaf port to another, or from one endpoint group (typically tied to the dot1q VLAN the vSwitch tags to outgoing packets) to another within the same leaf or across leaf switches of the network fabric, is very common. In such loosely-coupled network connectivity models, where the locality of the endpoints is not fixed, the network fabric and the endpoints become vulnerable to attacks by the rogue devices. For example, if the initial network access or the subsequent endpoint moves are allowed without any verification, it might lead to severe security issues. This enforces an important requirement on the underlying first hop switches that are responsible for network connectivity: to grant network access only to authorized endpoints and deny connectivity to unauthorized devices.

To limit the number of ports per leaf switch, leaves are grouped in pods, such as pod 318a. As would be appreciated a pod in an SDN fabric is a cross bar of smaller switches and can be seen as a large, virtual leaf node, characterized by its Radix which identifies the number of available switching ports.

Figure 3C:
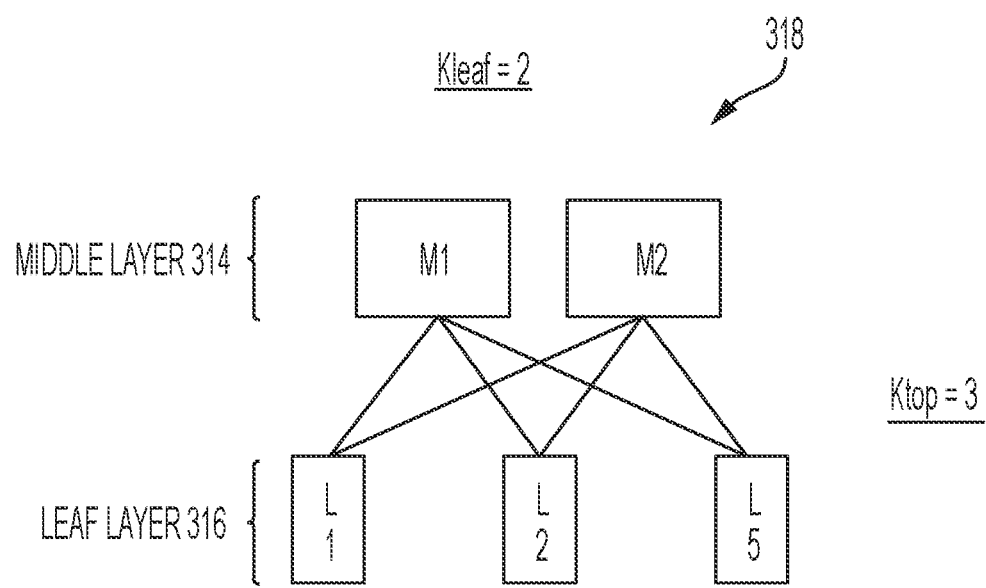

FIG. 3C illustrates an example pod 318 that can be formed by linking intermediate switching devices (e.g., ToP switches) in middle layer 314 with leaf switches in leaf layer 316. As shown, pod 318 has (K=Radix/2) ports connecting upward and as many downward, with Kleaf=2 top nodes of Ktop=3 ports down connected to Ktop leaves with Kleaf ports upward. This creates a virtual leaf node of (Kp=Kleaf*Ktop) ports. From there, pods of pods can be constructed recursively within the SDN fabric.

A Fat Tree has a number of pods interconnected by a superspine layer comprising ToF switching devices (i.e., superspine nodes). In an ideal fabric, there is at least one port per Top of Pod (ToP) switch on every Top-of-Fabric (ToF) switch in the superspine, where every northbound port of a leaf has a path to every ToF superspine node. In that case, the superspine layer 312 is fully meshed with the ToP pod top switches in the middle layer 314, and the fabric is not partitioned (i.e., unpartitioned). For example, in FIG. 3B, assume that M1-M2 and M3-M4 in middle layer 314 also form pods with pod 318a (M1 and M2 form a second pod 318 with leaf switches L1-L4, and M3 and M4 form a third pod 318 with leaf switches L5-L8). In such a case, the network would not be considered partitioned, as each of the pods 318 is fully meshed with superspine layer 312 (i.e., each ToP switch in the middle layer 314 is physically connected via a link layer connection with each ToF switch in the superspine layer 312).

In the case in which each pod is fully connected to superspine layer 312, a spine node has a Radix (number of ports) Rs=Np*Kleaf, where Np is the number of pods. This makes the connectivity from any spine node to any leaf node resilient to Kleaf-1 breakages in between. However, Rs rapidly becomes a gating factor for scalability, limiting the number of pods that can be attached to the superspine, in many implementations.

Figure 3D:
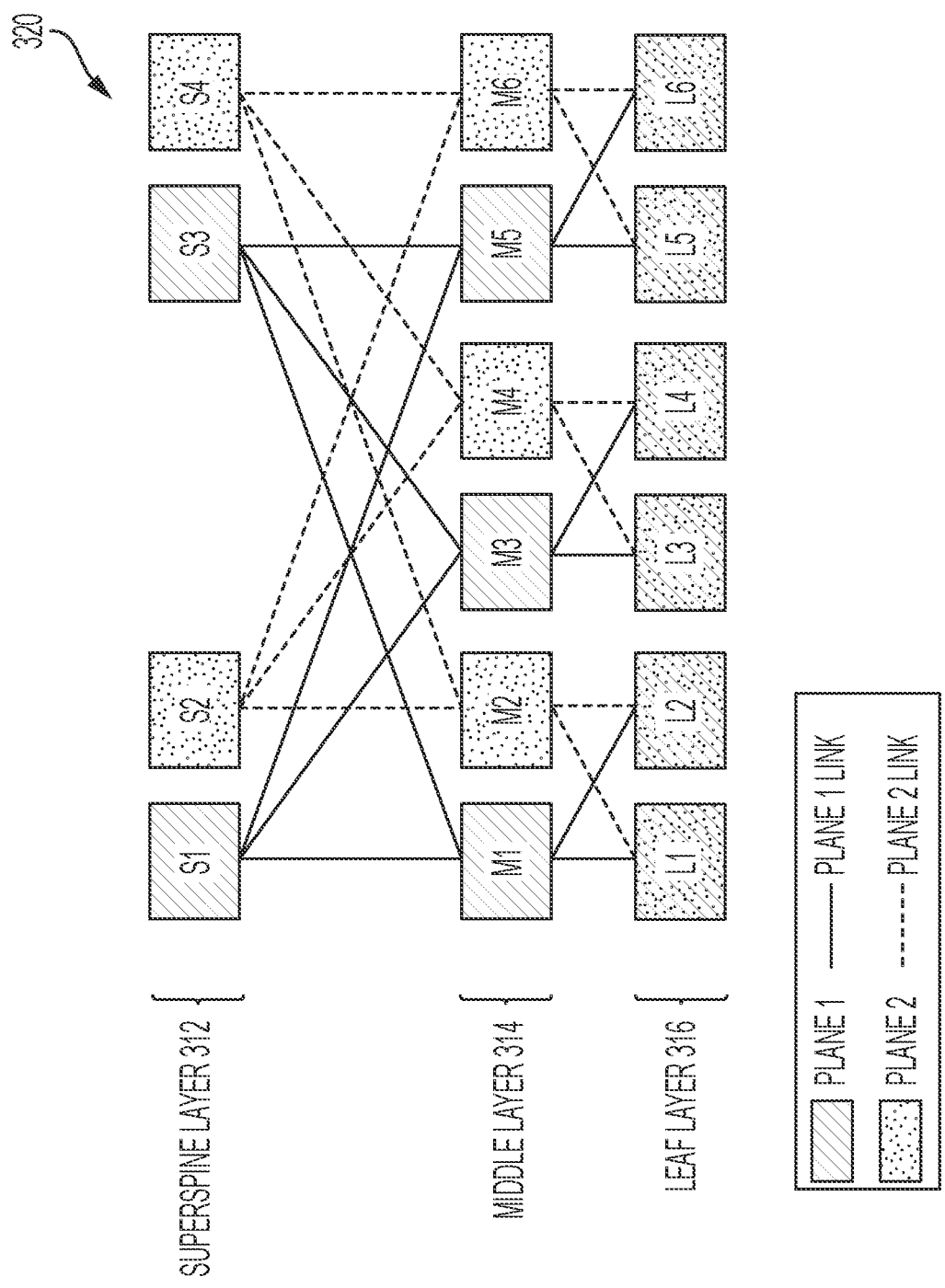

In a large fabric, or fabrics built from switches with a low Radix, the ToF is often partitioned in planes to reduce the number of required switch ports in a ToF switch. FIG. 3D illustrates an example SDN fabric 320 in which the fabric is partitioned into two separate planes: Plane 1 and Plane 2. As shown, while each ToF switch in superspine layer 312 is still connected to each leaf in leaf layer 316 (via a ToP switch), not every ToF switch in superspine layer is connected to every ToP switch in middle layer 314; hence, the number of required switch ports in a ToF switch (as well as the redundancy) is reduced (e.g., by a factor of 2), in comparison to non-partitioned fabrics.

Figure 3E:
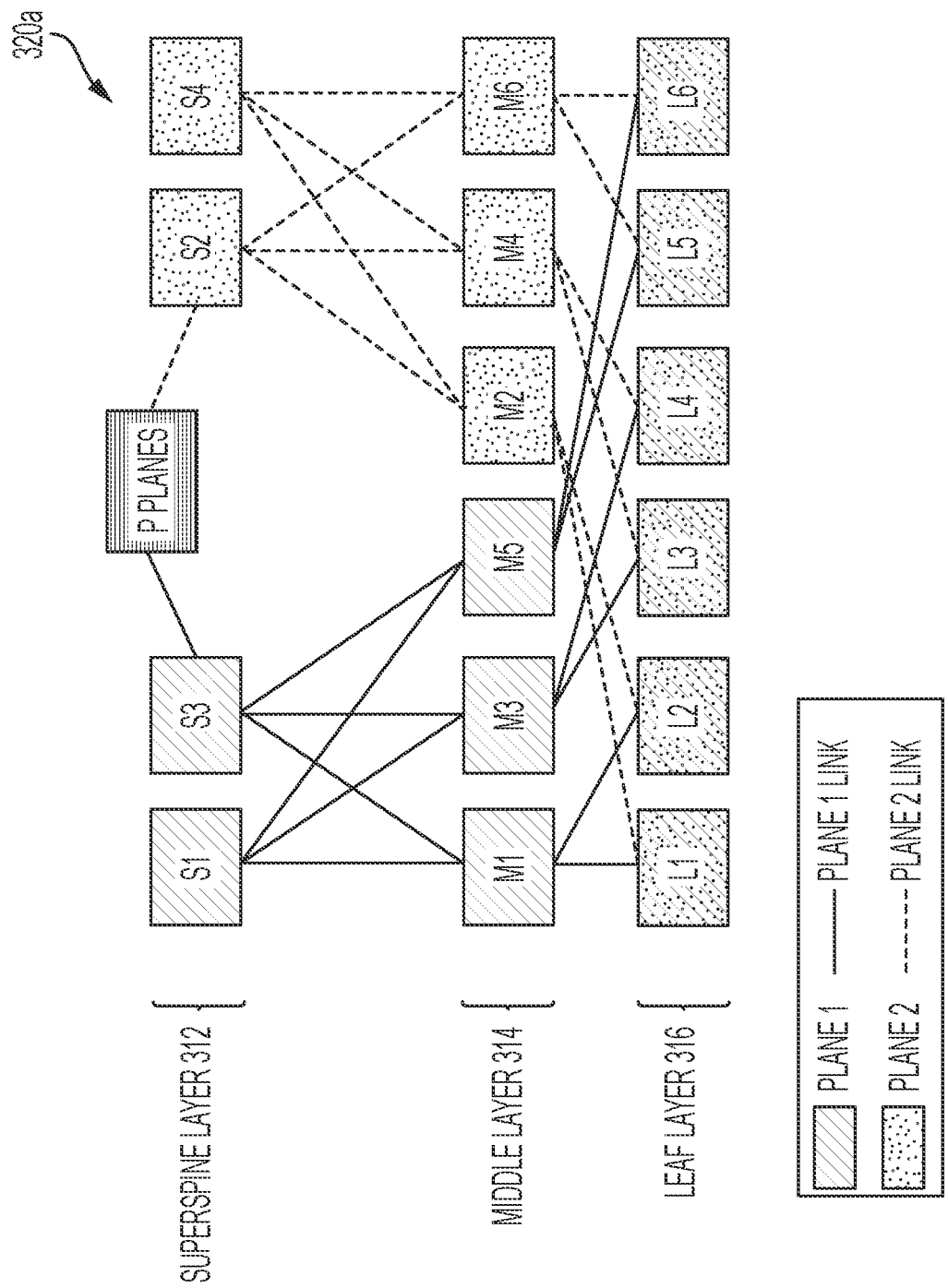

FIG. 3E illustrates another example SDN fabric 320a in which the fabric has been partitioned into P+2 number of planes: plane 1, plane 2, and P-number of other planes. As would be appreciated, the decision as to which plane to use in SDN fabric 320a is left to the leaves in leaf layer 316. In addition, a failure of an intermediate link or switch typically affects one or more planes, but not all.

The minimum connectivity for an SDN fabric, such as fabric 320a, is when each leaf in leaf layer 316 has a single path to each node in superspine layer 312, which happens when every ToF node connects to only one ToP node in each pod. This means that, at a maximum, there are exactly as many planes as there are northbound ports on a leaf Node (Kleaf=P*R). In that case, the ToF is maximally partitioned.

Figure 4:
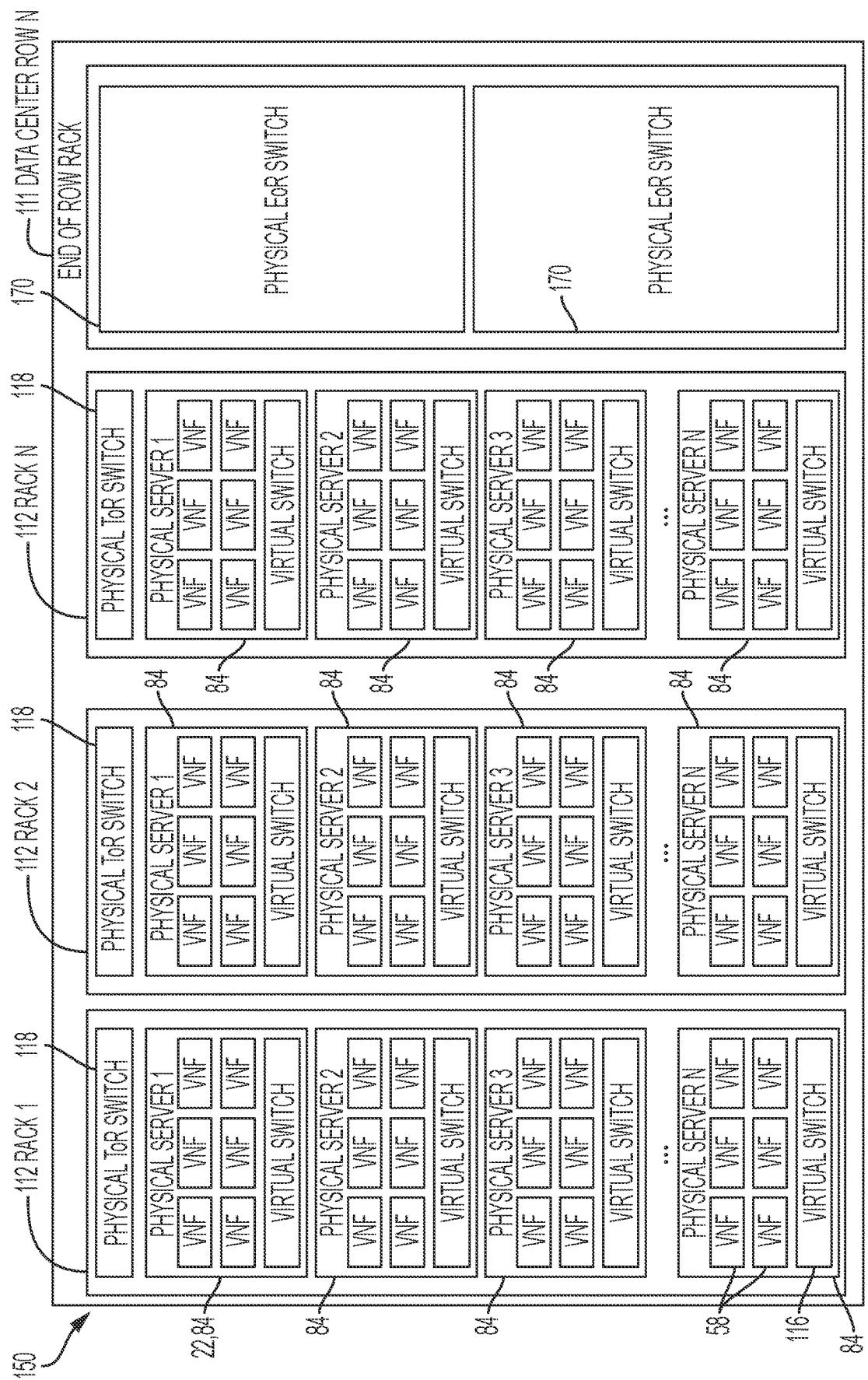
FIG. 4 illustrates an example implementation of any one of the data centers or local networks of FIG. 1, according to an example embodiment.

The complexity in interconnecting the switching devices in the leaf layer 316, the intermediate layer 314, and the superspine layer 312 is further illustrated in FIG. 4.

FIG. 4 illustrates an example implementation of the data center 150 of FIG. 1 comprising one or more virtualization hosts 22 coupled to a leaf switching device 118, according to an example embodiment. In particular, FIG. 4 illustrates an example implementation of a single row 111 of a physical data center 150 having multiple physical rows 111 and that can implement the example embodiments. The following description of a data center that can implement virtualized operations 58 (e.g., virtualized network functions (VNFs) and virtualized network services) according to example embodiments can help illustrate the complexity of maintaining scalable reachability between mobile destinations executed between virtualization hosts 22 in different regions of the data center 150 or even in different physical data centers 150.

Data center rooms typically are organized in multiple rows 111, with multiple physical racks 112 per row 111. Each physical rack 112 typically contains multiple physical servers 84, each representing physical resources upon which an orchestrator (not shown) can place (i.e., allocate, assign, etc.) a virtualized resource such as a virtualized network function (VNF) (e.g., 58). Each server 84 represents a corresponding virtualization host 22 in the Figures. Each server 84 also has a virtual switch (Vswitch) 116 configured for providing localized connections to (and between) the VNFs that reside on the physical server 84. Each rack 112 can include (e.g., at the top of the rack) a physical "Top of Rack" (ToR) switch 118, which provides the rack-level connectivity to (and between) the VNFs 58 that reside on different physical servers 84 within the corresponding rack 112. A multitude of racks 112 together comprise a row 111. Each row 111 in a data center can include at least one physical End of Row (EoR) switch 170, which provides aggregation of all ToR switches 118 and provides row-level connectivity for VNFs 58 that reside within the row on different racks 112.

The physical resources (e.g., compute, memory, and/or network) that are consumed to provide a virtualized network service are based on the placement of the associated VNFs 58 within the data center; in other words, more network resources are required to provide a virtualized network service if interdependent VNFs are placed within physical servers 84 that are further apart topologically within a data center, Ideally, all VNFs 58 for a particular virtualized service would reside on the same physical server 84, such that the communication flows between the VNFs 58 of the same service would be limited to only involve the Vswitch 116 in the same physical server 84; however, placement of all VNFs 58 associated with a particular virtualized service within a single physical server 84 may not always be possible due to limited resources within the single physical server 84/22.

The next ideal scenario is for all VNFs 58 associated with a particular service to reside on the same physical rack (e.g., "Rack 2") 112, which limits communication flow between VNFs 58 of the same virtual service to involve the corresponding ToR switch 118 for that rack (e.g., "Rack 2") 112, and the number NxV switches 116 associated with the servers 84 for the N VNFs 58. However, because there are limited resources within a single rack 112, allocating all VNFs 58 within a single rack 112 may not always be possible.

A less ideal scenario is when VNFs 58 associated with a particular virtualized service reside on different racks (e.g., "Rack 1" and "Rack N") 112 within the same row 111. The communication flow between the VNFs 58 for the same virtual service now involve the EoR switch 170 for that row 111, MxToR 118 switches (one for each rack 112 containing an associated VNF 58) and NxV switches 116 associated with the servers 84 for the N VNF 58. However, because there are limited resources within a single row 111, this allocation within a single row 111 may not always be possible.

An even less ideal scenario is when VNFs 58 associated with a particular virtualized network service reside on different rows 111 within the same data center 150. The communication flow between the VNFs associated with the same virtual service now involve LxEoR switches 170 (one for each row 111 containing an associated VNF 58), MxToR switches 118 (one for each rack 112 containing an associated VNF 58), and NxV switches 116 associated with the physical servers 84 for the N VNFs 58.

An orchestrator (not shown) is responsible for limiting the number of physical resources involved in the implementation of the virtual service, and ensure that interdependent VNFs 58 are located in such a way to minimize implications to ToR switches 112 and EoR switches 170 (i.e., minimize the use of the ToR switches 112 and/or EoR switches 170 for execution of a given virtualized network service). In the case of a distributed architecture that utilizes multiple physical data centers connected by wide area network (WAN) circuits, the management by the orchestrator becomes even more complex. Hence, coordination as a mobile destination moves throughout the data center 150 can become more difficult unless scalable reachability with the mobile destination can be maintained. Additional details regarding cloud-based deployments can be found, for example, in U.S. Pat. Nos. 8,892,708, 9,473,570, 9,729,406, 10,057,109, U.S. Pub. 2015/0200872, etc.

Scalable Mobility and Reachability in Leaf-Spine Switching Architecture

FIGS. 5A-5D illustrate a scalable reachability for a movable destination attached to a leaf-spine switching architecture, according to an example embodiment.

Figure 6A:
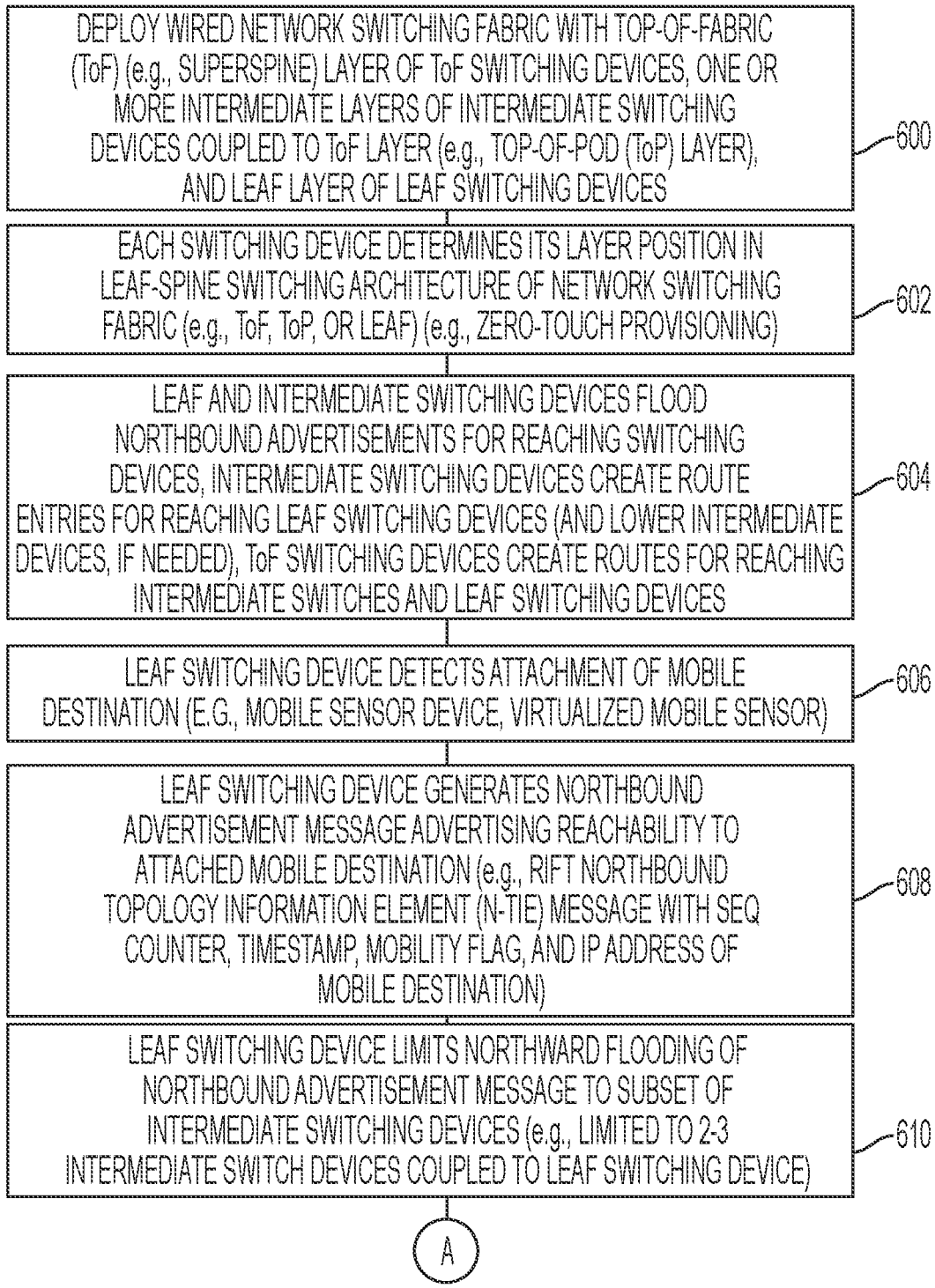
FIG. 6A-6C illustrate a method of providing scalable reachability for a movable destination attached to a leaf-spine switching architecture, according to an example embodiment.
Figure 6B:
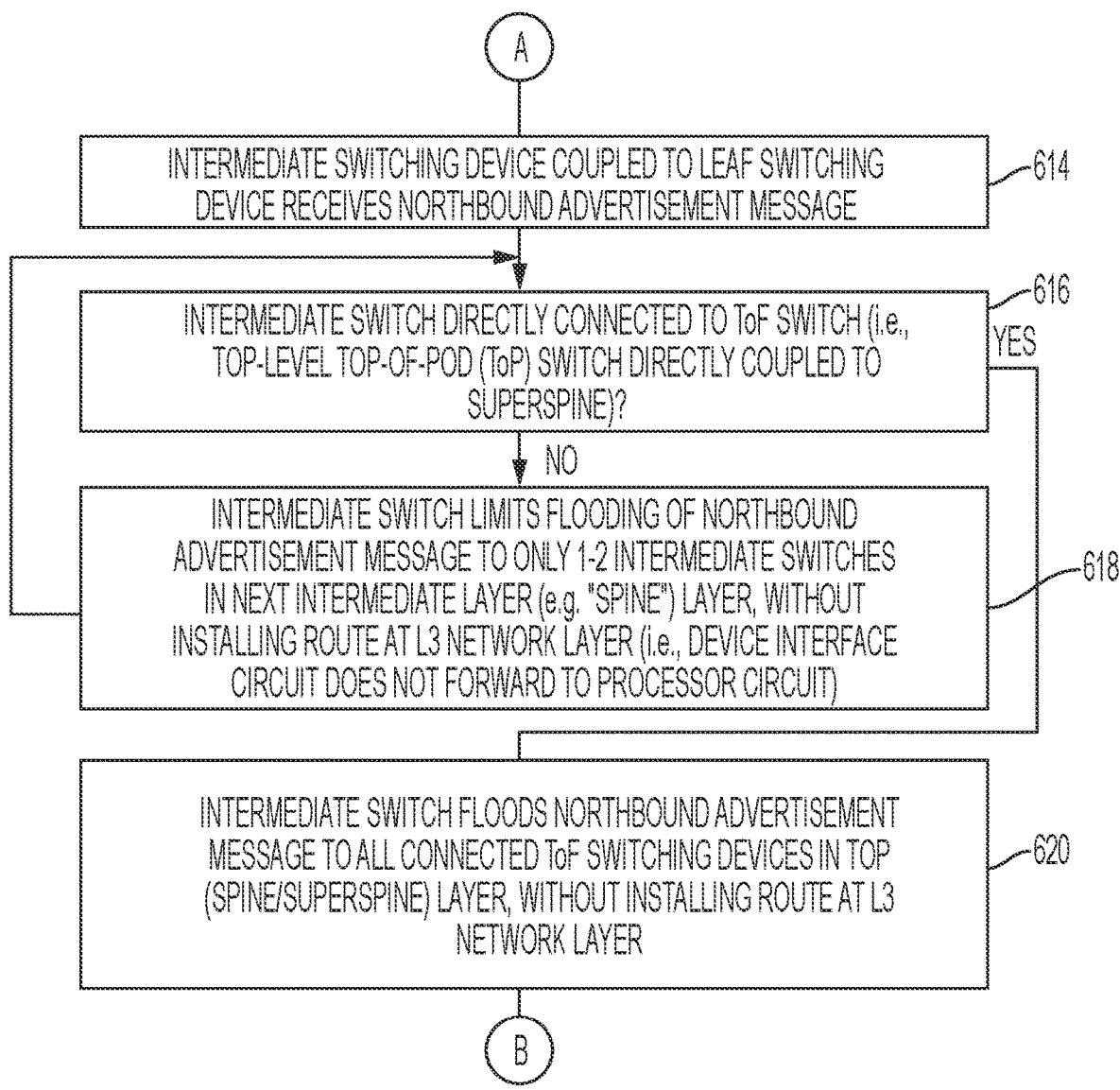
Figure 6C:
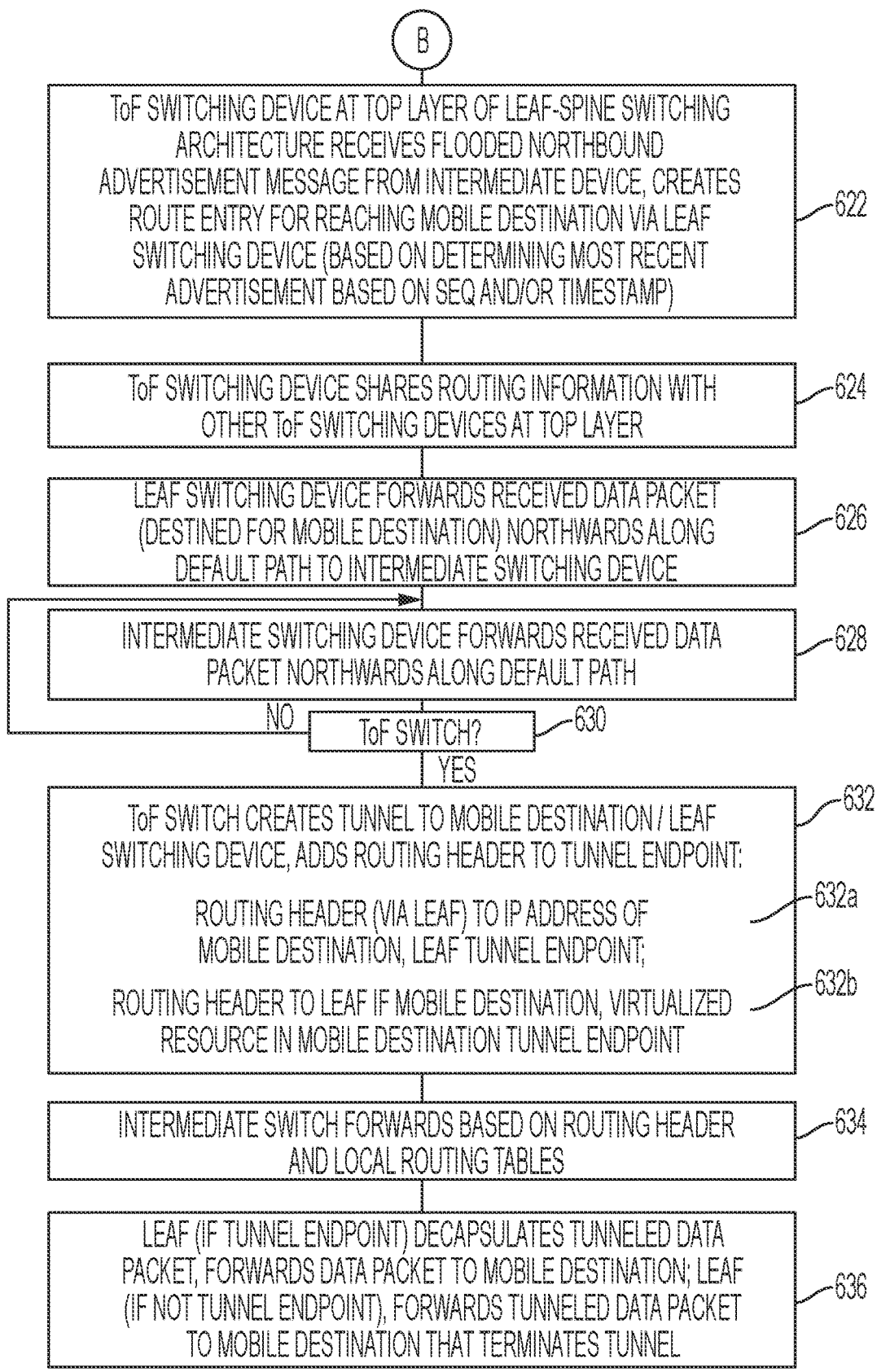

FIG. 6A-6C illustrate a method of providing scalable reachability for a movable destination attached to a leaf-spine switching architecture, according to an example embodiment. The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Figure 5A:
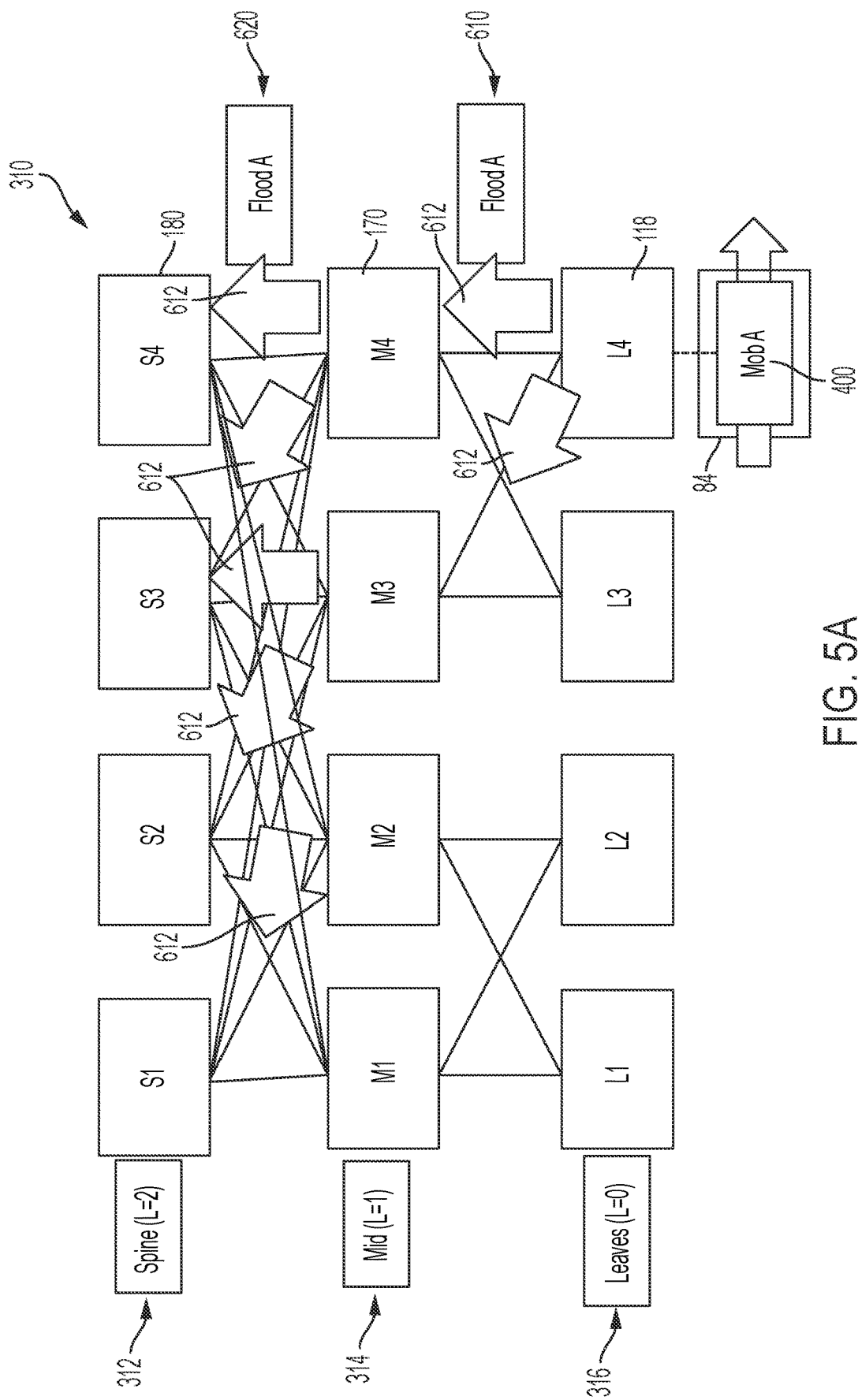
FIGS. 5A-5D illustrate a scalable reachability for a movable destination attached to a leaf-spine switching architecture, according to an example embodiment.

Referring to FIG. 6A, in operation 600 a wired network switching fabric (i.e., switched data network) 310 is deployed, for example as illustrated in FIG. 5A, as a leaf-spine switching architecture that comprises a ToF superspine layer 312 of ToF switching devices S1-S4 180, a second layer 314 of intermediate (ToP) switching devices M1-M4 170 coupled to the spine layer, and a leaf layer 316 of leaf network switching devices L1-L4 118 coupled to the second layer 314. Any leaf network switching device 118 can have a connected virtualization host 84 configured for executing a virtualized operation (58 of FIG. 4), for example a mobile virtualized agent 400.

Figure 5B:
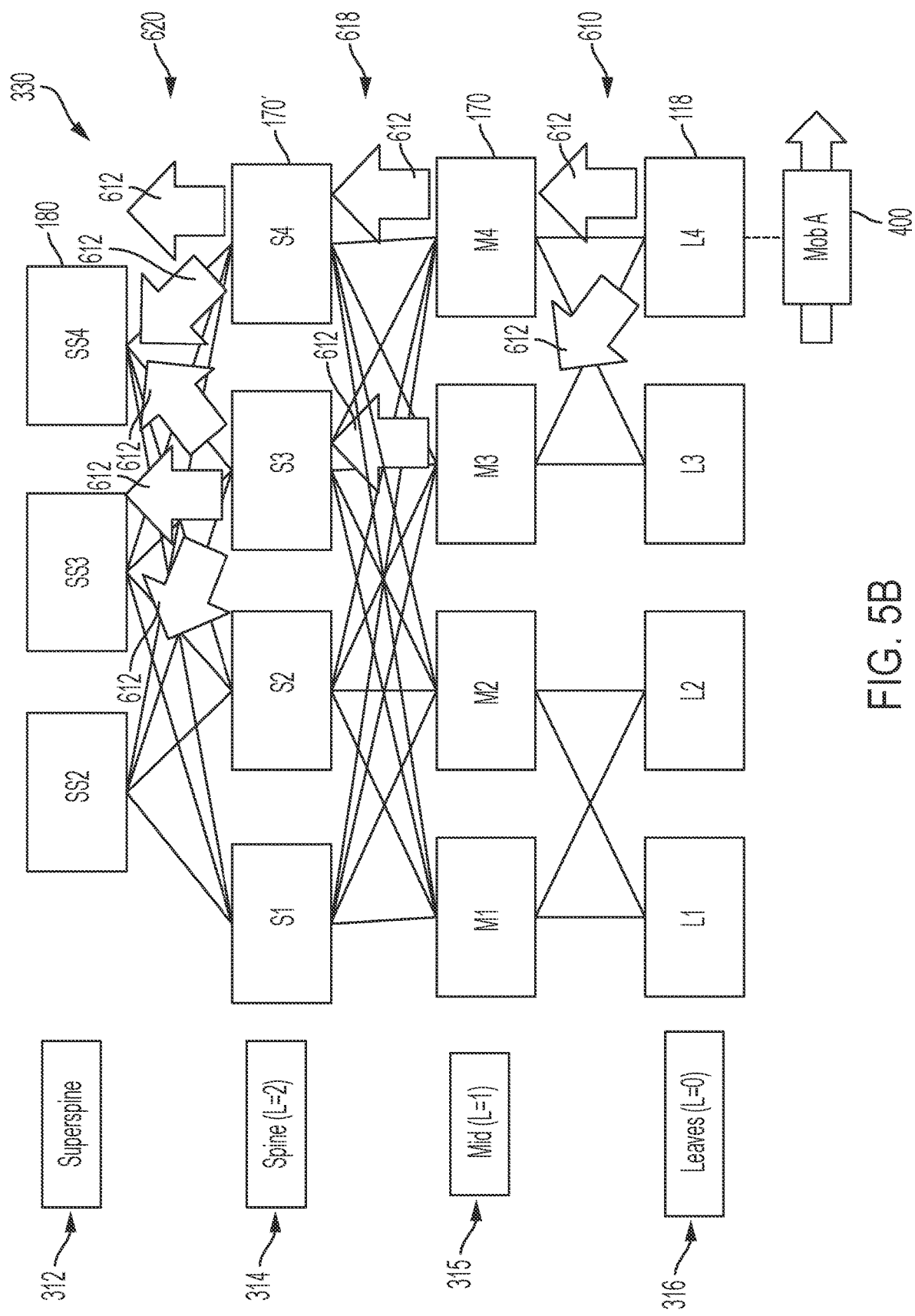
Figure 5C:
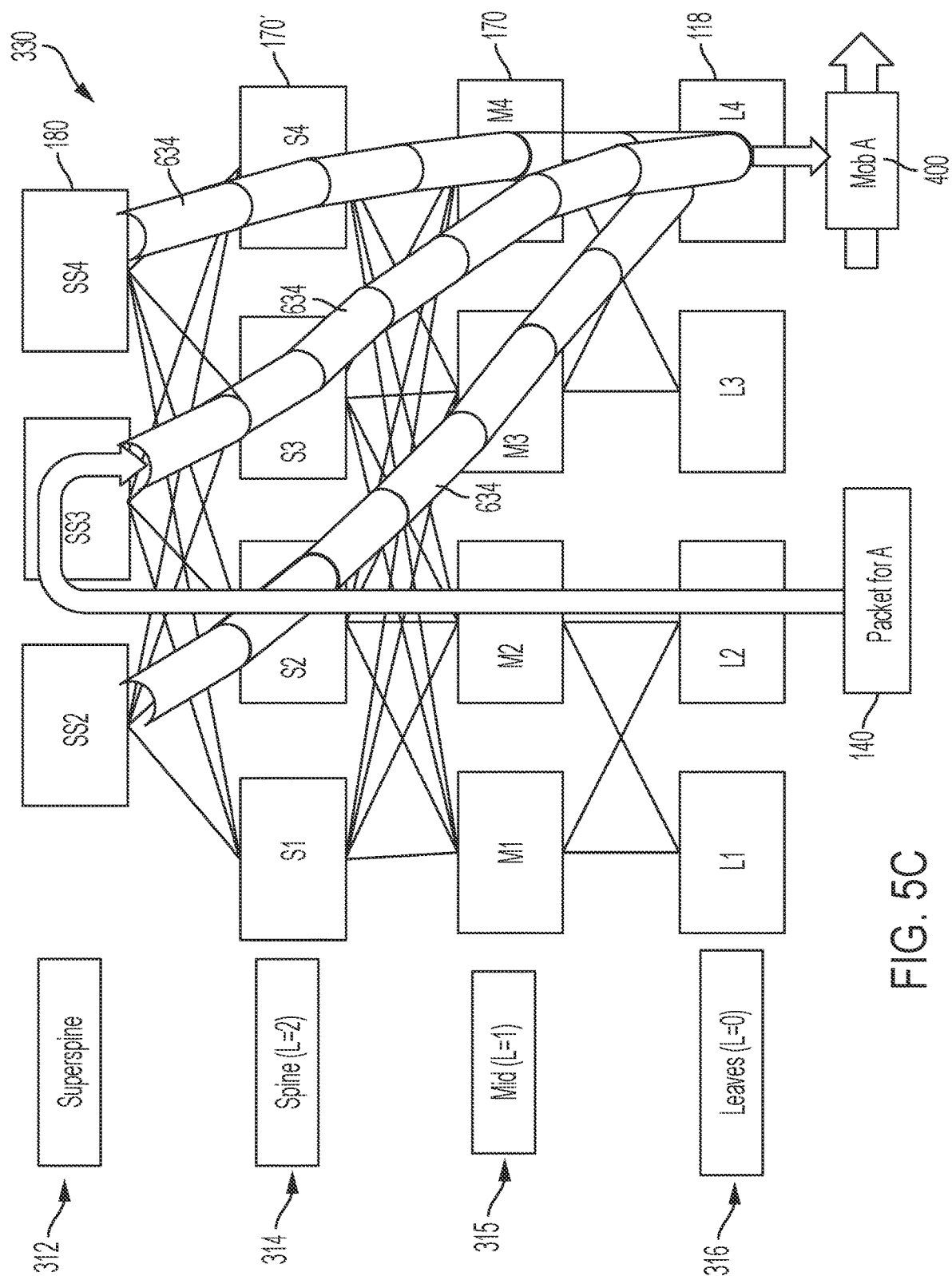
Figure 5D:
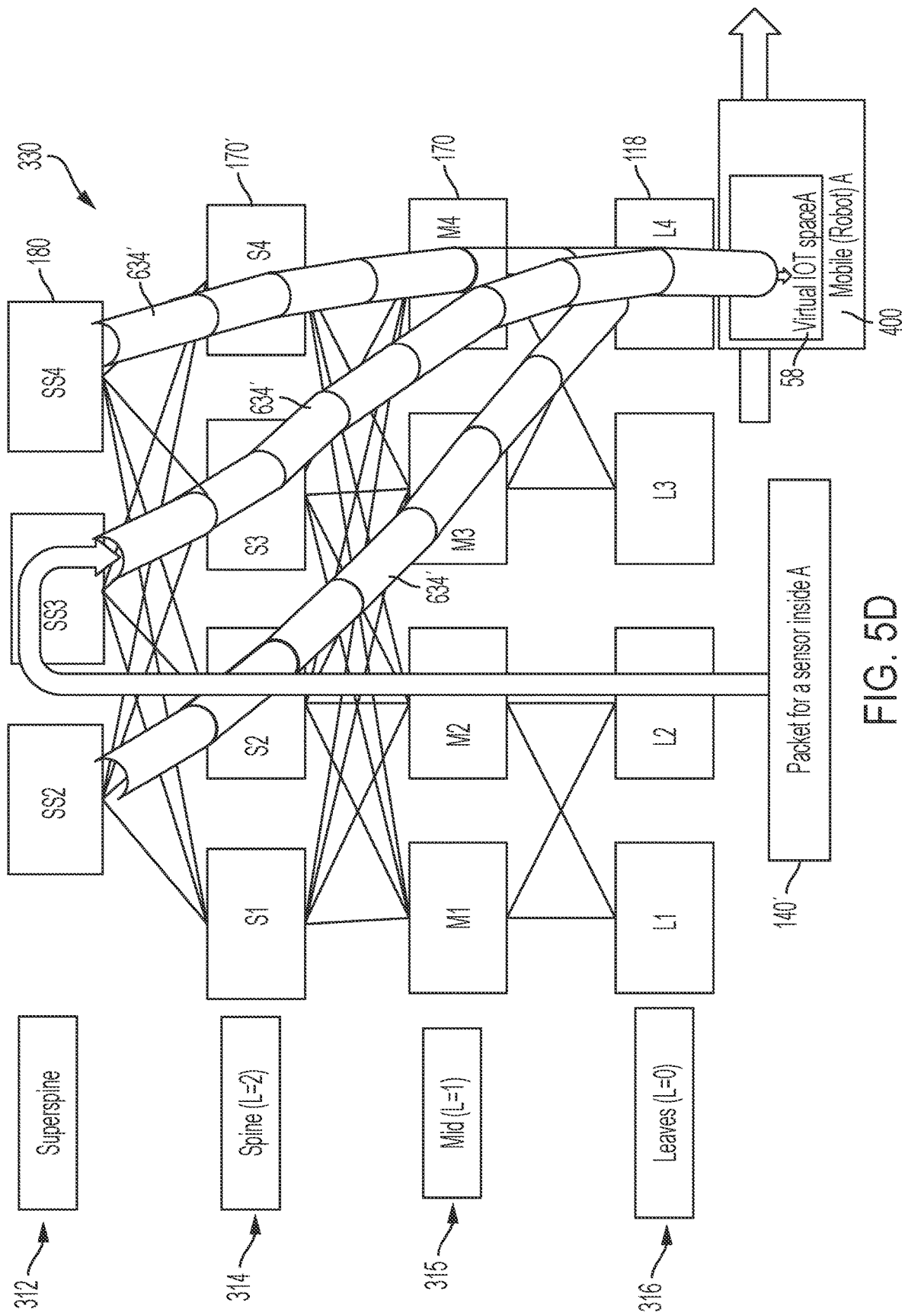

As illustrated in FIGS. 5B, 5C, and 5D, a switched data network 330 can be deployed in operation 600 to include an additional intermediate layer 315, such that the ToF superspine layer 312 in FIGS. 5B-5D include ToF switching devices SS2, SS3, and SS4 180; the second layer 314 comprises intermediate switching devices S1, S2, S3, and S4 170' coupled to the ToF superspine layer 312; the third intermediate layer 315 comprises switching devices M1, M2, M3, and M4 170 coupled to the second layer 314; and the leaf layer 316 comprises leaf switching devices L1, L2, L3, and L4 118 coupled to the third intermediate layer 315.

Each network switching device 118, 170, 170', and/or 180 can be configured for determining in operation 602 of FIG. 6A its position in the leaf-spine switching architecture 310 or 330, for example based on executing zero-touch provisioning that causes each network switching device 118, 170, 170', and/or 180 to determine its relative position in the leaf-spine switching architecture 310 or 330, for example based on executing a prescribed discovery operation between the network switching devices 118, 170, 170' and/or 180.

In response to each network switching device 118, 170, 170', and/or 180 determining its corresponding position as a leaf switching device 118, an intermediate switching device 170 (or 170'), or a ToF switching device 180, each network switching device 118, 170, 170', and/or 180 in operation 604 can initiate network-layer discovery to establish a network-based routing topology in the leaf-spine switching architecture 310 or 330, for example according to RIFT as described in the Internet Draft "RIFT: Routing in Fat Trees" (draft-ietf-rift-rift-02). In particular, each leaf network switching device 118 can flood to all available intermediate switching devices 170 a northbound Topology Information Element (N-TIE) advertisement message specifying one or more specific routes (e.g., specifying an IPv4 address and/or address prefix, IPv6 address and/or address prefix) reachable via the leaf network switching device 118 (e.g., via L3), for example a connected virtualization host device 84; each intermediate switching device 170 can create a route entry for reaching each advertising leaf network switching device 118, and optionally each connected virtualization host device 84 via the appropriate leaf network switching device 118. Similarly, each intermediate switching device 170 can flood a received northbound Topology Information Element (N-TIE) advertisement message to each and every intermediate switching device 170' in FIGS. 5B-5D, causing each intermediate switching device 170' to create a corresponding route entry in its memory circuit for reaching an intermediate switching device 170 and/or leaf network switching device 118. Each intermediate switching device 170' also can flood the received northbound Topology Information Element (N-TIE) advertisement message northward to each of the ToF switching devices 180, causing each ToF switching device 180 to create a route entry for reaching the intermediate switching devices 170', the intermediate switching devices 170, the leaf network switching devices 118, and/or the advertised destinations via the advertising leaf network switching devices 118. Hence, a ToF switching device 180 (and/or common parent switching device 170 and/or 170') can forward a data packet (forwarded by a first leaf network switching device 118 from an attached host network device 22/84) to a specified destination via the appropriate leaf network switching device 118.

As described previously, the flooding as executed in operation 604 is feasible for route discovery of the switching devices 118, 170, 170', and/or 180 that typically are implemented as fixed machines in rack-based systems as illustrated in FIG. 4. However, such flooding limits scalability for mobile destinations such as the mobile virtualized agent 400 (e.g., mobile sensor device, virtualized mobile sensor) that may reside in a given host network device 22/84 for only a few milliseconds before moving to another host network device 22/84. For example, if a mobile virtualized agent 400 moves from a first leaf switching device (e.g., "L1") 118 to a second leaf switching device (e.g., "L4"), old routes to reach the mobile virtualized agent 400 via the first leaf switching device (e.g., "L1" via "M1" or "M2") must be invalidated, and new routes need to installed to reach the mobile virtualized agent 400 via the second leaf switching device (e.g., "L4" via "M3" or "M4"). Flooding of advertisement messages throughout all the switching devices of the switched data network every few milliseconds, however, can quickly overwhelm the switched data network with excessive advertisement messages that can cause congestion in the switched data network; further, the intermediate switching devices would most likely be unable to update their routing tables in response to each of the flooded advertisement messages every few milliseconds.

Hence, according to example embodiments, a leaf network switching device 118 in operation 606 can detect attachment of a mobile destination (e.g., mobile virtualized agent 400). For example, the mobile virtualized agent 400 can initiate execution in a virtualization host device 84 attached to the leaf network switching device "L4" 118, for example, based on the mobile virtualized agent 400 causing the virtualization host device 84 to generate and send an advertisement to a link-local address specifying the IP address of the mobile virtualized agent 400.

The processor circuit 220 of the leaf network switching device (e.g., L4) 118 in operation 608 can respond to detecting reachability of a locally-attached mobile destination (e.g., a mobile virtualized agent 400) based on generating a northbound advertisement message (implemented, for example, as a N-TIE message) (612 of FIGS. 5A and 5B) that specifies that the advertised destination (e.g., an IP address and/or IP address prefix allocated to the mobile virtualized agent 400) is a mobile destination, for example based on setting a mobility flag (prescribed mobility bit) in the northbound advertisement message. The northbound advertisement message further can include a sequence counter associated with the mobile destination (e.g., the mobile virtualized agent 400) and a timestamp value that enables each receiving switching device to identify the most recent northbound advertisement message for the mobile virtualized agent 400 (as it moves between different virtualization hosts 84) based on a hybrid comparison of the highest sequence counter value relative to the most recent timestamp value.

The processor circuit 220 of the leaf network switching device "L4" 118 also can create a route entry for reaching a virtualized resource 58 executed in the mobile virtualized agent 400, for example if the mobile virtualized agent 400 is configured to use the virtualized resource 58 as a tunnel endpoint, described below.

As illustrated in FIGS. 5A and 5B, the processor circuit 220 of the leaf network switching device "L4" 118 in operation 610 can limit flooding of the advertisement message 612 to only a subset of the intermediate switching devices (e.g., M3, M4 170) instead of all the available intermediate switching devices 170. For example, if the leaf network switching device "L4" 118 is coupled to multiple (e.g., 5 or 6) intermediate switching devices 170, the leaf network switching device "L4" 118 can limit the flooding to only an identified subset (e.g., 2 to 3) of the available intermediate switching device 170.

Referring to FIG. 6B, the device interface circuit 210 of an intermediate switching device (e.g., M3 and/or M4) 170 coupled to the advertising leaf network switching device "L4" 118 in operation 614 can receive the northbound advertisement message 612 as generated in operation 608 and output in operation 610. If in operation 616 the device interface circuit 210 of the intermediate switching device 170 determines (e.g., from a prescribed configuration message from the corresponding processor circuit 220) that the intermediate switching device 170 is not directly connected to one or more ToF switching devices 180 in the ToF superspine layer 312 (as illustrated in FIG. 5B), the device interface circuit 210 of the intermediate switching device 170 (e.g., M3 and/or M4 in FIG. 5B) in the lower intermediate layer 315 can limit flooding of the northbound advertisement message 612 in operation 618 to only one-to-two intermediate switches (e.g., S3 or S4) 170' in the next intermediate layer 314, as opposed to flooding the northbound advertisement message 612 to all the intermediate switches (e.g., S1, S2, S3, and S4) in the next intermediate layer 314. In other words, in general a grand-child switching device of the ToF switching devices 180 (e.g., "grandchild" switching devices 118 in FIG. 5A, "grandchild switching devices 170 of FIG. 5B), as well as any network switching device "below" a grand-child switching device, can select the one-to-two intermediate switches for the limited flooding of the northbound advertisement message 612. As described below with respect to operation 620, a "child" switching device of the ToF switching devices 180 can execute unlimited flooding of the northbound advertisement message 612 to all the connected ToF switching devices 180. Hence, grandchild switching devices (and below) in the example embodiments limit flooding of the northbound advertisement message 612, as opposed to unlimited flooding as specified in RIFT.

The device interface circuit 210 of the intermediate switching device 170 (e.g., M3 and/or M4 in FIG. 5B) in operation 618 also suppresses forwarding of the northbound advertisement message 612 to its associated processor circuit 220, ensuring there is no network-layer (L3) processing of the received northbound advertisement message 612; hence, the northbound advertisement message 612 is forwarded by the device interface circuit 210 without any route installation at the network layer in order to avoid consuming any resources of the processor circuit 220.

If in operation 616 the device interface circuit 210 of the intermediate switching device (e.g., M3 and/or M4 170 of FIG. 5A, or S3 or S4 170' of FIG. 5B) determines that the intermediate switching device is directly connected to one or more ToF switching devices 180 in the ToF superspine layer 312, the device interface circuit 210 of the intermediate switching device that is connected to the ToF superspine layer 312 executes unlimited flooding of the northbound advertisement message 612 in operation 620 to all the connected ToF switching devices 180 in the ToF superspine layer 312. As described previously, the device interface circuit 210 of the intermediate switching device (e.g., M3 and/or M4 170 of FIG. 5A, or S3 or S4 170' of FIG. 5B) also suppresses forwarding of the northbound advertisement message 612 to its associated processor circuit 220, ensuring there is no network-layer (L3) processing of the received northbound advertisement message 612; hence, the northbound advertisement message 612 is forwarded by the device interface circuit 210 without any route installation at the network layer in order to avoid consuming any resources of the processor circuit 220.

Hence, the intermediate switching devices 170 and 170' can flood in operation 620 the northbound advertisement message 612 to all the connected ToF switching devices 180 in the ToF superspine layer 312. The processor circuit 220 of each ToF switching device 180 is configured for responding in operation 622 to the most recently received northbound advertisement message 612 by creating and installing (or updating) a route entry in its memory circuit 240 based on the routing information specified within the northbound advertisement message 612, the route entry specifying that the mobile virtualized agent 400 (or a virtualized resource 58 executed within the mobile virtualized agent 400) is reachable via the leaf network switching device "L4" 118: each ToF switching device 180 can determine the most recently received northbound advertisement message 612 either by the most recent sequence identifier value and/or the most recent timestamp value, depending on the resolution of the timestamp value relative to the sequence identifier values (the sequence value can have sufficient allocated bits to avoid wrap-around before a change in the precision of the timestamp value). The route entry includes an instruction specifying tunneling any data packet destined for the mobile virtualized agent 400 (or any virtualized resource 58 executed within the mobile virtualized agent 400 and claiming its own IP address) via the leaf network switching device "L4" 118. Each of the ToF switching devices 180 in operation 624 can optionally synchronize their routing tables, enabling each of the ToF switching devices 180 to determine that the mobile virtualized agent 400 (or any virtualized resource 58 executed within the mobile virtualized agent 400 and claiming its own IP address) is reachable via the leaf network switching device "L4" 118: operation 624 can be optional because as described previously one or more of the ToP switching devices (170 of FIG. 5A, 170' of FIG. 5B) can execute unrestricted flooding of the northbound advertisement message 612 to each of the ToF switching devices 180.

Hence, referring to FIG. 5C, any leaf switching device (e.g., L2 118) can forward in operation 626 a data packet 140 destined for the mobile virtualized agent 400 (or a virtualized resource 58 executed therein) via its default path northwards to its connected intermediate switching device (e.g., M2 170 of FIG. 5C).

The device interface circuit 210 of the intermediate switching device (e.g., M2 170 of FIG. 5C) in operation 628 can forward the received data packet 140 via its default path northwards to the next connected switching device. If in operation 630 the next connected switching device is not a ToF switching device 180 (e.g., the intermediate switching device "S2" in the second intermediate layer 314 of FIG. 5C), the device interface circuit 210 of the next connected intermediate switching device (e.g., "S2") can forward the received data packet 140 via its default path northwards to any one ToF switching device 180 in the ToF superspine layer 312.

Figure 7:
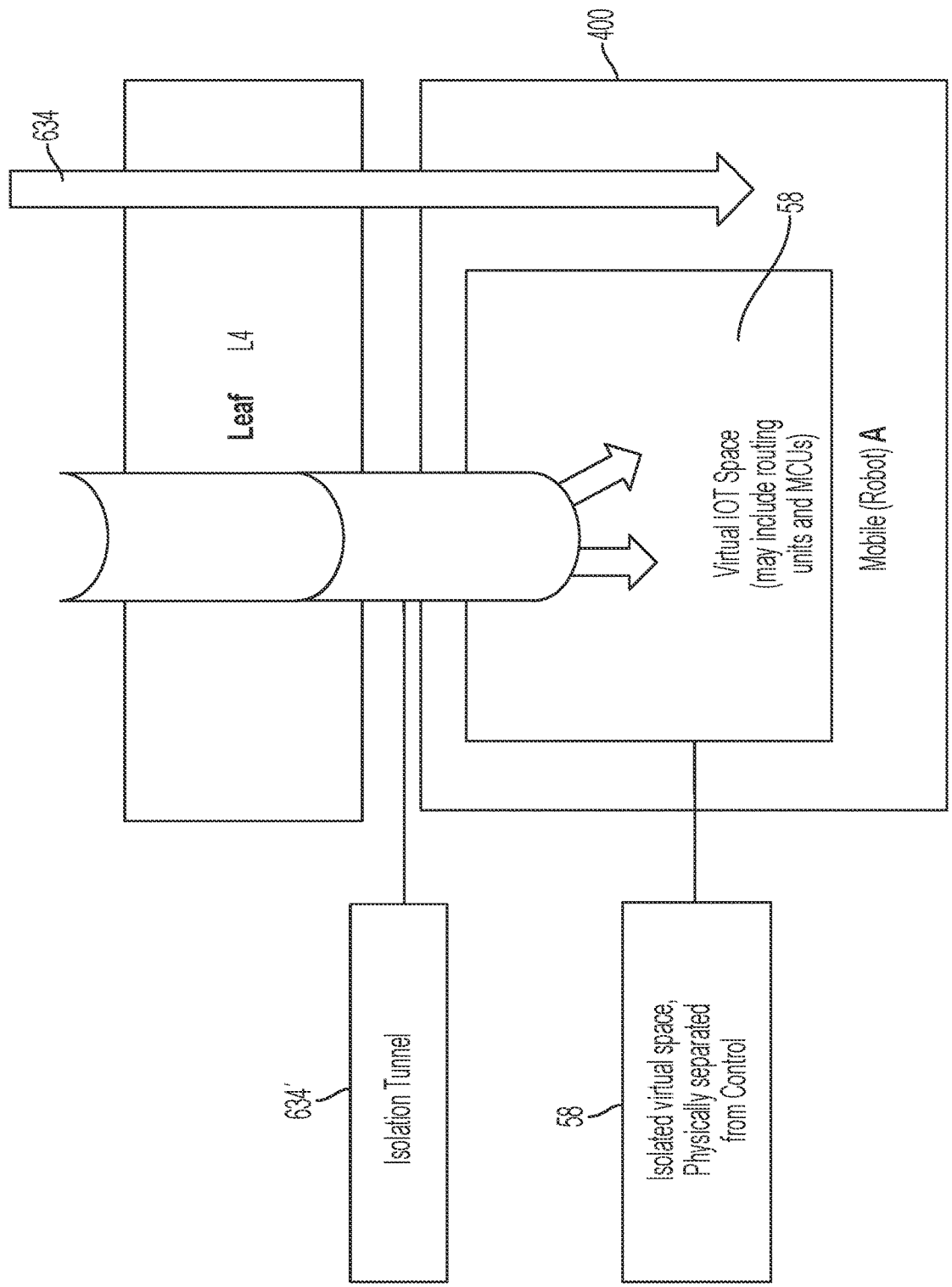
FIG. 7 illustrate a movable destination implemented as a mobile virtualized agent executed in a host network device attached to the leaf-spine architecture of FIG. 5D, according to an example embodiment.

The processor circuit 220 of any ToF switching device (e.g., "SS3") 180 can respond to reception of the data packet 140 destined for the mobile virtualized agent 400 by determining from its routing table entry that the destination is a mobile destination; hence, the processor circuit 220 of the ToF switching device (e.g., "SS3") 180 in operation 632 can create a tunnel (634 of FIG. 5C) that terminates at the leaf network switching device "L4" 118 (operation 632a), or a tunnel (634' of FIG. 5D) that terminates at the virtualized resource 58 executed within the mobile virtualized agent 400 (operation 632b), as illustrated in FIGS. 5D and 7, based on the routing information that was specified in the northbound advertisement message 612.

Hence, the device interface circuit 210 of any ToF switching device can output the tunneled data packet in operation 632 southward to the next intermediate switch 170 or 170'. Any intermediate switch in the next second intermediate layer 314 can forward in operation 634 the tunneled data packet based on the intermediate switch in the next second intermediate layer 314 determining from its local routing table the reachability to the leaf network switching device "L4" 118; hence, the intermediate switch "S3" 170' of FIG. 5C or 5D can determine in operation 634 that the leaf network switching device "L4" 118 is reachable via the intermediate switch "M3" and/or "M4" 170; similarly, the intermediate switch "M3" and/or "M4" 170 can determine in operation 634 that the leaf network switching device "L4" 118 is directly reachable via one of its switch ports, and can forward the tunneled data packet to the leaf network switching device "L4" 118 accordingly.

The leaf network switching device "L4" 118 can respond to reception of the tunneled data packet by decapsulating the tunneled data packet in operation 636 if the leaf network switching device "L4" 118 identifies from the routing header that it is the tunnel endpoint for the tunnel 634. Hence, the leaf network switching device "L4" 118 can forward the decapsulated data packet 140 to the mobile virtualized agent 400.

The leaf network switching device "L4" 118 also can respond to reception of the tunneled data packet by determining from the routing header if the tunneled data packet is to be forwarded as-is to the virtualized resource 58 executed in the mobile virtualized agent 400 (e.g., via the tunnel 634' of FIG. 5D or FIG. 7). Hence, the leaf network switching device "L4" 118 can forward the tunneled data packet to the virtualized resource 58 executed in the mobile virtualized agent 400, enabling the virtualized resource 58 (serving as tunnel endpoint for the tunnel 634') to decapsulate the data packet 140 for processing in the virtualized resource 58 executed in the mobile virtualized agent 400.

Hence, as illustrated in FIG. 7, the mobile virtualized agent 400 can utilize multiple tunnels 634', 634" initiated by a ToF switching device 180 for multiple flows in different virtualized resources executed in the mobile virtualized agent 400 hosted by the current virtualization host device 84.

According to example embodiments, a scalable reachability can be established for movable destinations connected to a leaf-spine switching architecture by limiting northbound advertisements (originated by advertising leaf switching devices) to only a selected few intermediate switching devices that can flood the northbound advertisements to Top-of-Fabric switching devices and without any route installation in the intermediate switching devices. The Top-of-Fabric switching devices can tunnel data packets to the movable destinations via tunnels dynamically generated by the Top-of-Fabric switching devices toward the advertising leaf switching devices, based on the routing information in the northbound advertisements. The example embodiments enable reachability to be maintained with the movable destinations, even if the movable destinations (implemented as a mobile virtualized agent executed in a first virtualization host) move to different virtualization host devices after only a few milliseconds.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   determining, by a network switching device, that the network switching device is configured as one of multiple intermediate switching devices in a switched data network having a leaf-spine switching architecture that further comprises leaf switching devices and Top-of-Fabric (ToF) switching devices;
   receiving, by the network switching device from one of the leaf switching devices, an advertisement indicating a mobile destination is reachable via the one leaf switching device;
   advertising, by the network switching device, the advertisement to connected ToF switching devices, wherein the network switching device does not install any routing information specified within the advertisement;
   the advertisement that is advertised by the network switching device causing at least one of the connected ToF switching devices to install the routing information and tunnel a data packet, destined for the mobile destination, as a tunneled data packet via the network switching device to the one leaf switching device, wherein the tunneled data packet causes the one leaf switching device to:
   terminate the tunneled data packet based on decapsulating the tunneled data packet carrying the data packet, and forwarding the data packet to the mobile destination connected to the one leaf switching device, or
   forward the tunneled data packet to the mobile destination connected to the one leaf switching device, the mobile destination terminating the tunneled data packet as a mobile virtualized agent executed in an attached host device.

2. The method of claim 1, wherein the leaf-spine switching architecture comprises a spine layer of the ToF switching devices, a second layer of the intermediate switching devices coupled to the spine layer, and a leaf layer of the leaf switching devices coupled to the second layer.

3. The method of claim 1, wherein the one leaf switching device limits advertising of the advertisement only to a subset of the intermediate switching devices identified by the one leaf switching device as repeaters and including the network switching device.

4. The method of claim 1, wherein the network switching device advertises, at a link layer, the advertisement without any network layer processing of the advertisement containing the routing information, and without forwarding the advertisement to a processor circuit in the one intermediate switching device.

5. The method of claim 1, wherein the advertisement causes the one ToF switching device to create a routing entry specifying tunneling the packet in response to detecting the destination is a mobile device.

6. The method of claim 1, wherein the advertisement causes the one connected ToF switching device to share the routing information with at least one other of the ToF switching devices.

7. The method of claim 1, wherein the installing of the routing information is based on the one connected ToF switching device determining the advertised advertisement is a newest advertisement, based on a sequence counter value and a timestamp value in the advertised advertisement, relative to a corresponding sequence counter value and timestamp value in a second advertised advertisement specifying second reachability to the mobile destination.

8. An apparatus implemented as a physical machine, the apparatus comprising:
non-transitory machine readable media configured for storing executable machine readable code;
a device interface circuit configured for communications in a switched data network; and
a processor circuit configured for executing the machine readable code, and when executing the machine readable code operable for:
determining that the apparatus is configured as one of multiple intermediate switching devices in a switched data network having a leaf-spine switching architecture that further comprises leaf switching devices and Top-of-Fabric (ToF) switching devices,
receiving, from one of the leaf switching devices, an advertisement indicating a mobile destination is reachable via the one leaf switching device,
the device interface circuit configured for advertising the advertisement to connected ToF switching devices without the processor circuit installing any routing information specified within the advertisement;
the advertisement advertised by the device interface circuit causing at least one of the connected ToF switching devices to install the routing information and a data packet, destined for the mobile destination, as a tunneled data packet via the apparatus to the one leaf switching device, wherein the tunneled data packet causes the one leaf switching device to execute one of:
terminating the tunneled data packet based on decapsulating the tunneled data packet carrying the data packet, and forwarding the data packet to the mobile destination connected to the one leaf switching device, or
forwarding the tunneled data packet to the mobile destination connected to the one leaf switching device, the mobile destination terminating the tunneled data packet as a mobile virtualized agent executed in an attached host device.

9. The apparatus of claim 8, wherein the advertisement causes the one ToF switching device to store a routing entry specifying tunneling the packet in response to detecting the destination is a mobile device.

10. The apparatus of claim 8, wherein the leaf-spine switching architecture comprises a spine layer of the ToF switching devices, a second layer of the intermediate switching devices coupled to the spine layer, and a leaf layer of the leaf switching devices coupled to the second layer.

11. The apparatus of claim 8, wherein the one leaf switching device limits advertising of the advertisement only to a subset of the intermediate switching devices identified by the one leaf switching device as advertising repeaters and including the network switching device.

12. The apparatus of claim 8, wherein the apparatus advertises, at a link layer, the advertisement without any network layer processing of the advertisement containing the routing information, and without the device interface circuit forwarding the advertisement to the processor circuit.

13. The apparatus of claim 8, wherein the advertisement causes the one connected ToF switching device to share the routing information with at least one other of the ToF switching devices.

14. One or more non-transitory tangible media encoded with logic for execution by a machine and when executed by the machine operable for:
determining, by the machine implemented as a network switching device, that the network switching device is configured as one of multiple intermediate switching devices in a switched data network having a leaf-spine switching architecture that further comprises leaf switching devices and Top-of-Fabric (ToF) switching devices;
receiving, by the network switching device from one of the leaf switching devices, an advertisement indicating a mobile destination is reachable via the one leaf switching device;
advertising the advertisement to connected ToF switching devices, wherein the network switching device does not install any routing information specified within the advertisement;
the advertisement advertised by the network switching device causing at least one of the connected ToF switching devices to install the routing information and tunnel a data packet, destined for the mobile destination, as a tunneled data packet via the network switching device to the one leaf switching device, wherein the tunneled data packet causes the one leaf switching device to:
terminate the tunneled data packet based on decapsulating the tunneled data packet carrying the data packet, and forwarding the data packet to the mobile destination connected to the one leaf switching device, or
forward the tunneled data packet to the mobile destination connected to the one leaf switching device, the mobile destination terminating the tunneled data packet as a mobile virtualized agent executed in an attached host device.

15. The one or more non-transitory tangible media of claim 14, wherein the leaf-spine switching architecture comprises a spine layer of the ToF switching devices, a second layer of the intermediate switching devices coupled to the spine layer, and a leaf layer of the leaf switching devices coupled to the second layer.

16. The one or more non-transitory tangible media of claim 14, wherein the one leaf switching device limits advertising of the advertisement only to a subset of the intermediate switching devices identified by the one leaf switching device as advertising repeaters and including the network switching device.

17. The one or more non-transitory tangible media of claim 14, wherein the network switching device advertises, at a link layer, the advertisement without any network layer processing of the advertisement containing the routing information, and without forwarding the advertisement to a processor circuit in the one intermediate switching device.

18. The one or more non-transitory tangible media of claim 14, wherein the advertisement causes the one ToF switching device to create a routing entry specifying tunneling the packet in response to detecting the destination is a mobile device.

19. The one or more non-transitory tangible media of claim 14, wherein the advertisement causes the one ToF switching device to share the routing information with at least one other of the ToF switching devices.

20. The one or more non-transitory tangible media of claim 14, wherein the installing of the routing information is based on the one connected ToF switching device determining the advertised advertisement is a newest advertisement, based on a sequence counter value and a timestamp value in the advertised advertisement, relative to a corresponding sequence counter value and timestamp value in a second advertised advertisement specifying second reachability to the mobile destination.

* * * * *